(12) United States Patent
Shaw et al.

(10) Patent No.: US 10,952,037 B2
(45) Date of Patent: *Mar. 16, 2021

(54) MULTI-SLICING ORCHESTRATION SYSTEM AND METHOD FOR SERVICE AND/OR CONTENT DELIVERY

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,040

(22) Filed: Feb. 10, 2020

(65) Prior Publication Data

US 2020/0236512 A1 Jul. 23, 2020

Related U.S. Application Data

(63) Continuation of application No. 16/455,180, filed on Jun. 27, 2019, now Pat. No. 10,602,320, which is a
(Continued)

(51) Int. Cl.
*H04W 4/08* (2009.01)
*H04W 36/26* (2009.01)
(Continued)

(52) U.S. Cl.
CPC .......... *H04W 4/08* (2013.01); *H04L 41/0893* (2013.01); *H04L 41/0896* (2013.01);
(Continued)

(58) Field of Classification Search
CPC . H04L 41/0896; H04L 41/12; H04L 63/0815; H04L 63/105; H04L 67/1044;
(Continued)

(56) References Cited

U.S. PATENT DOCUMENTS 4,285,469 A 8/1981 Huang
5,671,253 A 9/1997 Stewart
(Continued)

FOREIGN PATENT DOCUMENTS

CN 102045896 A 5/2011
CN 105052074 2/2014
(Continued)

OTHER PUBLICATIONS

"Cell Site on Light Trucks", 2007, 1 page.
(Continued)

*Primary Examiner* — Gbemileke J Onamuti
(74) *Attorney, Agent, or Firm* — Guntin & Gust, PLC; Atanu Das

(57) ABSTRACT

Aspects of the subject disclosure may include, for example, detecting a first communication device including an application based on contemporaneous access of a first service and second service functions, wherein the application communicates via first and second user data traffic flows associated with the first and second service functions. An association is facilitated of the first user data traffic flow with a first logical network slice, wherein the first user data traffic flow is conveyed by the first logical network slice. An association is facilitated of the second user data traffic flow with a second logical network slice, wherein the first and second user data traffic flows are conveyed contemporaneously by the first and second logical network slices. Other embodiments are disclosed.

20 Claims, 8 Drawing Sheets

Related U.S. Application Data continuation of application No. 15/590,648, filed on May 9, 2017, now Pat. No. 10,382,903.

(51) Int. Cl.
| | | |
|---|---|---|
| *H04W 4/70* | (2018.01) | |
| *H04W 12/08* | (2009.01) | |
| *H04W 12/06* | (2009.01) | |
| *H04W 24/02* | (2009.01) | |
| *H04W 48/18* | (2009.01) | |
| *H04L 12/24* | (2006.01) | |
| *H04L 12/08* | (2006.01) | |
| *H04L 12/06* | (2006.01) | |
| *H04L 29/06* | (2006.01) | |
| *H04L 29/08* | (2006.01) | |
| *H04W 4/50* | (2018.01) | |
| *H04W 12/00* | (2021.01) | |

(52) U.S. Cl.
CPC .......... *H04L 41/12* (2013.01); *H04L 63/0815* (2013.01); *H04L 63/105* (2013.01); *H04L 67/1044* (2013.01); *H04W 4/70* (2018.02); *H04W 12/06* (2013.01); *H04W 12/08* (2013.01); *H04W 24/02* (2013.01); *H04W 36/26* (2013.01); *H04W 48/18* (2013.01); *H04W 4/50* (2018.02); *H04W 12/00502* (2019.01); *H04W 12/00503* (2019.01)

(58) Field of Classification Search
CPC ....... H04W 4/08; H04W 12/06; H04W 12/08; H04W 24/02; H04W 36/26; H04W 48/18
See application file for complete search history.

(56) References Cited

U.S. PATENT DOCUMENTS

| | | |
|---|---|---|
| 5,970,408 A | 10/1999 | Carlsson et al. |
| 6,246,883 B1 | 6/2001 | Lee |
| 6,795,686 B2 | 9/2004 | Master et al. |
| 6,873,620 B1 | 3/2005 | Coveley et al. |
| 7,167,923 B2 | 1/2007 | Lo et al. |
| 7,206,294 B2 | 4/2007 | Garahi et al. |
| 7,486,678 B1 | 2/2009 | Devanagondi et al. |
| 7,532,640 B2 | 5/2009 | Kelly et al. |
| 7,660,583 B2 | 2/2010 | Pekonen et al. |
| 7,787,414 B2 | 8/2010 | Le Faucheur et al. |
| 8,145,208 B2 | 3/2012 | Chari et al. |
| 8,234,650 B1 | 7/2012 | Eppstein et al. |
| 8,385,977 B2 | 2/2013 | Fein et al. |
| 8,593,968 B2 | 11/2013 | Santiago et al. |
| 8,621,058 B2 | 12/2013 | Eswaran et al. |
| 8,676,219 B2 | 3/2014 | Lennvall et al. |
| 8,868,069 B2 | 10/2014 | Bennett et al. |
| 9,077,478 B1 | 7/2015 | Schmidtke et al. |
| 9,078,284 B2 | 7/2015 | Richardson |
| 9,119,016 B2 | 8/2015 | Durand et al. |
| 9,225,587 B2 | 12/2015 | Zhang et al. |
| 9,225,652 B2 | 12/2015 | Li et al. |
| 9,245,246 B2 | 1/2016 | Breitgand et al. |
| 9,270,815 B2 | 2/2016 | Shaw et al. |
| 9,298,515 B2 | 3/2016 | McMurry et al. |
| 9,301,333 B2 | 3/2016 | Choi et al. |
| 9,305,301 B2 | 4/2016 | Paul et al. |
| 9,306,909 B2 | 4/2016 | Koponen et al. |
| 9,311,108 B2 | 4/2016 | Cummings |
| 9,330,156 B2 | 5/2016 | Satapathy |
| 9,369,390 B2 | 6/2016 | Bantukul et al. |
| 9,378,043 B1 | 6/2016 | Chen et al. |
| 9,384,028 B1 | 7/2016 | Felstaine et al. |
| 9,391,897 B2 | 7/2016 | Sparks et al. |
| 9,392,471 B1 | 7/2016 | Thomas et al. |
| 9,401,962 B2 | 7/2016 | Parker et al. |
| 9,407,542 B2 | 8/2016 | Vasseur et al. |
| 9,436,443 B2 | 9/2016 | Chiosi et al. |
| 9,445,341 B2 | 9/2016 | Spinelli et al. |
| 9,450,823 B2 | 9/2016 | Rhee et al. |
| 9,461,729 B2 | 10/2016 | Djukic et al. |
| 9,497,572 B2 | 11/2016 | Britt et al. |
| 9,503,969 B1 | 11/2016 | Zakaria et al. |
| 9,544,120 B2 | 1/2017 | Scholten et al. |
| 9,553,806 B2 | 1/2017 | Anand |
| 9,559,980 B2 | 1/2017 | Li et al. |
| 9,565,074 B2 | 2/2017 | Lehane et al. |
| 9,602,422 B2 | 3/2017 | Padmanabhan et al. |
| 9,762,402 B2 | 9/2017 | Batz et al. |
| 9,907,113 B2 | 2/2018 | Cheng et al. |
| 9,961,624 B1 | 5/2018 | Zait |
| 10,193,984 B2 | 1/2019 | Haddad et al. |
| 2003/0123446 A1 | 7/2003 | Muirhead et al. |
| 2003/0145106 A1 | 7/2003 | Brown et al. |
| 2004/0103308 A1 | 5/2004 | Paller et al. |
| 2005/0003010 A1 | 1/2005 | Cohen et al. |
| 2006/0029097 A1 | 2/2006 | McGee et al. |
| 2007/0140269 A1 | 6/2007 | Donnelli et al. |
| 2008/0232272 A1 | 9/2008 | Gelbman et al. |
| 2008/0285492 A1 | 11/2008 | Vesterinen et al. |
| 2009/0129296 A1 | 5/2009 | Grinshpun et al. |
| 2010/0234071 A1 | 9/2010 | Shabtay et al. |
| 2011/0182227 A1 | 7/2011 | Rune et al. |
| 2011/0282931 A1 | 11/2011 | Chen et al. |
| 2012/0140749 A1 | 6/2012 | Caldwell et al. |
| 2012/0303828 A1 | 11/2012 | Young et al. |
| 2013/0010756 A1 | 1/2013 | Liang et al. |
| 2013/0046665 A1 | 2/2013 | Zabawskyj et al. |
| 2013/0072199 A1 | 3/2013 | Miyagawa et al. |
| 2013/0337872 A1 | 12/2013 | Fertl et al. |
| 2014/0023044 A1 | 1/2014 | Sjölinder et al. |
| 2014/0070892 A1 | 3/2014 | Matsuoka et al. |
| 2014/0220923 A1 | 8/2014 | Shoshan et al. |
| 2014/0226496 A1 | 8/2014 | Raleigh et al. |
| 2014/0254382 A1 | 9/2014 | Randriamasy et al. |
| 2014/0259012 A1 | 9/2014 | Nandlall et al. |
| 2014/0269435 A1 | 9/2014 | McConnell et al. |
| 2014/0301192 A1 | 10/2014 | Lee et al. |
| 2014/0307556 A1 | 10/2014 | Zhang et al. |
| 2014/0349611 A1 | 11/2014 | Kant et al. |
| 2014/0376454 A1 | 12/2014 | Boudreau et al. |
| 2014/0376555 A1 | 12/2014 | Choi et al. |
| 2015/0055623 A1 | 2/2015 | Li |
| 2015/0063166 A1 | 3/2015 | Sif et al. |
| 2015/0067676 A1 | 3/2015 | Madani et al. |
| 2015/0097731 A1 | 4/2015 | Russell |
| 2015/0109967 A1 | 4/2015 | Hogan et al. |
| 2015/0113100 A1 | 4/2015 | Tweedale et al. |
| 2015/0139238 A1 | 5/2015 | Pourzandi et al. |
| 2015/0154258 A1 | 6/2015 | Xiong et al. |
| 2015/0163159 A1 | 6/2015 | DeCusatis et al. |
| 2015/0172115 A1 | 6/2015 | Nguyen et al. |
| 2015/0200844 A1 | 7/2015 | Zhu et al. |
| 2015/0236898 A1 | 8/2015 | Bonnier et al. |
| 2015/0237556 A1 | 8/2015 | Giloh |
| 2015/0257012 A1 | 9/2015 | Zhang |
| 2015/0257038 A1 | 9/2015 | Scherzer |
| 2015/0295833 A1 | 10/2015 | Mizukoshi et al. |
| 2015/0304281 A1 | 10/2015 | Kasturi et al. |
| 2015/0319078 A1 | 11/2015 | Lee et al. |
| 2015/0350102 A1 | 12/2015 | Leon-Garcia et al. |
| 2015/0358236 A1 | 12/2015 | Roach et al. |
| 2015/0363219 A1 | 12/2015 | Kasturi et al. |
| 2015/0378753 A1 | 12/2015 | Phillips et al. |
| 2015/0382278 A1 | 12/2015 | Fallon et al. |
| 2016/0014787 A1 | 1/2016 | Zhang et al. |
| 2016/0021588 A1 | 1/2016 | Kamdar et al. |
| 2016/0044136 A1 | 2/2016 | Schiff et al. |
| 2016/0062746 A1 | 3/2016 | Chiosi et al. |
| 2016/0073278 A1 | 3/2016 | Roessler et al. |
| 2016/0080484 A1 | 3/2016 | Earl |
| 2016/0088092 A1 | 3/2016 | Cardona-Gonzalez et al. |
| 2016/0094255 A1 | 3/2016 | Meredith et al. |
| 2016/0094395 A1 | 3/2016 | Hu |
| 2016/0094641 A1 | 3/2016 | Rahman et al. |
| 2016/0094668 A1 | 3/2016 | Chang et al. |

(56) References Cited

U.S. PATENT DOCUMENTS

| | | |
|---|---|---|
| 2016/0095019 A1 | 3/2016 | Cui et al. |
| 2016/0095042 A1 | 3/2016 | Wadhwa |
| 2016/0105821 A1 | 4/2016 | Senarath et al. |
| 2016/0105893 A1 | 4/2016 | Senarath et al. |
| 2016/0112327 A1 | 4/2016 | Morris et al. |
| 2016/0112335 A1 | 4/2016 | Bouanen et al. |
| 2016/0112903 A1 | 4/2016 | Kaushik et al. |
| 2016/0113018 A1 | 4/2016 | Li |
| 2016/0127169 A1 | 5/2016 | Bull et al. |
| 2016/0127230 A1 | 5/2016 | Cui et al. |
| 2016/0127239 A1 | 5/2016 | Kahn et al. |
| 2016/0142282 A1 | 5/2016 | Guo |
| 2016/0150421 A1 | 5/2016 | Li et al. |
| 2016/0150448 A1 | 5/2016 | Perras et al. |
| 2016/0156513 A1 | 6/2016 | Zhang et al. |
| 2016/0164787 A1 | 6/2016 | Roach et al. |
| 2016/0212017 A1 | 7/2016 | Li et al. |
| 2016/0218948 A1 | 7/2016 | Djukic |
| 2016/0218971 A1 | 7/2016 | Basunov |
| 2016/0219076 A1 | 7/2016 | Paczkowski et al. |
| 2016/0234730 A1 | 8/2016 | John et al. |
| 2016/0248860 A1 | 8/2016 | Dunbar et al. |
| 2016/0249353 A1 | 8/2016 | Nakata et al. |
| 2016/0262044 A1 | 9/2016 | Calin et al. |
| 2016/0286043 A1 | 9/2016 | John et al. |
| 2016/0294732 A1 | 10/2016 | Chou et al. |
| 2016/0294734 A1 | 10/2016 | Jang et al. |
| 2016/0295614 A1 | 10/2016 | Lee et al. |
| 2016/0301566 A1 | 10/2016 | Ramasubramani et al. |
| 2016/0352645 A1 | 12/2016 | Senarath et al. |
| 2016/0352924 A1 | 12/2016 | Senarath et al. |
| 2016/0353268 A1 | 12/2016 | Senarath et al. |
| 2016/0353367 A1 | 12/2016 | Vrzic et al. |
| 2016/0353422 A1 | 12/2016 | Vrzic et al. |
| 2016/0353465 A1 | 12/2016 | Vrzic et al. |
| 2016/0359682 A1 | 12/2016 | Senarath et al. |
| 2016/0373372 A1 | 12/2016 | Gillon et al. |
| 2016/0373474 A1 | 12/2016 | Sood et al. |
| 2016/0381146 A1 | 12/2016 | Zhang et al. |
| 2016/0381528 A1 | 12/2016 | Lee et al. |
| 2016/0381662 A1 | 12/2016 | Wang |
| 2017/0005390 A1 | 1/2017 | Zakaria et al. |
| 2017/0026887 A1 | 1/2017 | Sirotkin et al. |
| 2017/0034761 A1 | 2/2017 | Narayanan |
| 2017/0054595 A1 | 2/2017 | Zhang et al. |
| 2017/0064591 A1 | 3/2017 | Padfield et al. |
| 2017/0064666 A1 | 3/2017 | Zhang |
| 2017/0070892 A1 | 3/2017 | Song et al. |
| 2017/0078157 A1 | 3/2017 | Zhang |
| 2017/0078183 A1 | 3/2017 | Civanlar et al. |
| 2017/0079059 A1 | 3/2017 | Li et al. |
| 2017/0085493 A1 | 3/2017 | Senarath et al. |
| 2017/0086049 A1 | 3/2017 | Vrzic |
| 2017/0086111 A1 | 3/2017 | Vrzic et al. |
| 2017/0086118 A1 | 3/2017 | Vrzic |
| 2017/0104609 A1 | 4/2017 | Mcnamee et al. |
| 2017/0104688 A1 | 4/2017 | Mirahsan et al. |
| 2017/0141973 A1 | 5/2017 | Vrzic |
| 2017/0142591 A1 | 5/2017 | Vrzic |
| 2017/0150376 A1 | 5/2017 | Shoshan et al. |
| 2017/0150399 A1 | 5/2017 | Kedalagudde et al. |
| 2017/0164187 A1 | 6/2017 | Lu |
| 2017/0164212 A1 | 6/2017 | Opsenica et al. |
| 2017/0164349 A1 | 6/2017 | Zhu et al. |
| 2017/0164419 A1 | 6/2017 | Kim |
| 2017/0257276 A1 | 9/2017 | Chou et al. |
| 2017/0257870 A1 | 9/2017 | Farmanbar et al. |
| 2017/0272978 A1 | 9/2017 | Giloh et al. |
| 2017/0295535 A1 | 10/2017 | Sherman |
| 2017/0302369 A1 | 10/2017 | Kwoczek et al. |
| 2017/0303189 A1 | 10/2017 | Hampel et al. |
| 2017/0303259 A1 | 10/2017 | Lee et al. |
| 2017/0318468 A1 | 11/2017 | Aijaz |
| 2017/0332212 A1 | 11/2017 | Gage |
| 2017/0339567 A1 | 11/2017 | Li et al. |
| 2017/0357528 A1 | 12/2017 | Puranik et al. |
| 2017/0367081 A1 | 12/2017 | Cui |
| 2018/0124660 A1 | 5/2018 | Zhang et al. |
| 2018/0131578 A1 | 5/2018 | Cui et al. |
| 2018/0139109 A1 | 5/2018 | Zuerner |
| 2018/0241635 A1 | 8/2018 | Rao et al. |
| 2018/0302877 A1 | 10/2018 | Bosch et al. |
| 2018/0316608 A1 | 11/2018 | Dowlatkhah et al. |
| 2018/0316615 A1 | 11/2018 | Shaw et al. |
| 2018/0316779 A1 | 11/2018 | Dowlatkhah et al. |
| 2018/0332441 A1 | 11/2018 | Shaw et al. |
| 2018/0332442 A1 | 11/2018 | Shaw et al. |
| 2018/0368060 A1 | 12/2018 | Kedalagudde et al. |
| 2018/0368140 A1 | 12/2018 | Centonza et al. |
| 2018/0376407 A1 | 12/2018 | Myhre et al. |
| 2018/0376412 A1 | 12/2018 | Bischinger |
| 2019/0014470 A1 | 1/2019 | Bischinger |
| 2019/0028943 A1 | 1/2019 | Wang et al. |
| 2019/0037446 A1 | 1/2019 | Dowlatkhah et al. |
| 2019/0053102 A1 | 2/2019 | Oohira et al. |
| 2019/0132781 A1 | 5/2019 | Arnold et al. |
| 2019/0191305 A1 | 6/2019 | Dowlatkhah et al. |
| 2019/0200174 A1 | 6/2019 | Shaw et al. |
| 2019/0320298 A1 | 10/2019 | Shaw et al. |
| 2020/0084628 A1 | 3/2020 | Dowlatkhah et al. |
| 2020/0145792 A1 | 5/2020 | Shaw et al. |
| 2020/0221347 A1 | 7/2020 | Dowlatkhah et al. |
| 2020/0259744 A1 | 8/2020 | Dowlatkhah et al. |

FOREIGN PATENT DOCUMENTS

| | | |
|---|---|---|
| CN | 104955172 | 3/2014 |
| CN | 105516312 A | 4/2016 |
| CN | 105979542 A | 9/2016 |
| CN | 106257944 A | 12/2016 |
| EP | 2955631 | 12/2015 |
| JP | 5656803 B2 | 1/2015 |
| KR | 101259548 | 5/2009 |
| KR | 101328344 B1 | 11/2013 |
| KR | 20150132774 | 5/2014 |
| KR | 101531834 | 9/2014 |
| KR | 1473783 | 12/2014 |
| WO | 2000067449 | 11/2000 |
| WO | 2014071084 A2 | 5/2014 |
| WO | 2015031512 A1 | 3/2015 |
| WO | 015057960 | 4/2015 |
| WO | 2015057960 A1 | 4/2015 |
| WO | 2015103297 | 7/2015 |
| WO | 2015198087 A1 | 12/2015 |
| WO | 2016051237 | 4/2016 |
| WO | 2016126238 A1 | 8/2016 |
| WO | 2016126347 A1 | 8/2016 |
| WO | 2016141518 A1 | 9/2016 |
| WO | 2016162467 A1 | 10/2016 |
| WO | 2016192639 A1 | 12/2016 |
| WO | 2016206372 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017054841 | 4/2017 |
| WO | 2017057025 A1 | 4/2017 |
| WO | 2017058067 | 4/2017 |
| WO | 2017071228 | 5/2017 |
| WO | 2017074486 A1 | 5/2017 |
| WO | 2017078770 | 5/2017 |
| WO | 2017119844 | 7/2017 |
| WO | 2017123045 A1 | 7/2017 |
| WO | 2017124003 A1 | 7/2017 |

OTHER PUBLICATIONS

"Dynamic end-to-end network slicing for 5G", White Paper, https://resources.ext.nokia.com/asset/200339, 2016, 1-10.

"Network Slicing", ericsson.com, Apr. 12, 2017.

"Network Slicing for 5G Networks and Services", 5G Americas™, 5gamericas.org, Nov. 2016.

(56) References Cited

OTHER PUBLICATIONS

"The Edge of the Cloud 5G Technology Blog", edgeofcloud.blogspot.com, TechBlogger, pen, Apr. 8, 2017.
Akyildiz, Ian, "Wireless software-defined networks (W-SDNs) and network function virtualization (NFV) for 5G cellular systems: An overview and qualitative evaluation", 2015, 14 pages.
Akyildiz, Ian F. et al., "A roadmap for traffic engineering in SDN-OpenFlow networks", Computer Networks 71, 2014, 1-30.
Biral, Andrea et al., "The Challenges of M2M Massive Access in Wireless Cellular Networks", Department of Information Engineering of the University of Padova, Mar. 27, 2015, 1-19.
Bor-Yaliniz, et al., "The new frontier in RAN heterogeneity: Multi-tier drone-cells", 2016, 9 pages.
Chen, Xu, "Intelligence on Optical Transport SDN", International Journal of Computer and Communication Engineering 4.1: 5., 2015.
Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), IEEE. IEEE, 2014., 2014, 1-8.
Deak, Gabriel et al., "IoT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.
Dhekne, et al., "Extending Cell Tower Coverage through Drones", 2017, 6 pages.
Ghavimi, Fayezeh et al., "M2M Communications in 3GPP LTE/LTE-A Networks: Architectures, Service Requirements, Challenges, and Applications", IEEE Communication Surveys & Tutorials, vol. 17, No. 2, Second Quarter 2015, May 9, 2015, 525-549.
Gramaglia, Marco et al., "Flexible connectivity and QoE/QoS management for 5G Networks: The 5G NORMA view", Communications Workshops (ICC), 2016 IEEE International Conference on. IEEE, 2016.
Hakiri, et al., "Leveraging SDN for the 5G Networks: Trends, Prospects and Challenges", 2015, 23 pages.
Hakiri, Akram et al., "Leveraging SDN for the 5G Networks: Trends, Prospects and Challenges", arXiv preprint arXiv:1506.02876, Jun. 8, 2015, 1-24.
Inam, et al., "Towards automated service-oriented lifecycle management for 5G networks", 2015, 8 pages.
Katsalis, et al., "5g architectural design patterns", 2016, 7 pages.
Le, Long B., "Enabling 5G Mobile Wireless Technologies", EURASIP Journal on Wireless Communications and Networking 2015.1 (2015): 218., 2015, 1-14.
McCullough, Don, "Why 5G Network Slices?", ericsson.com, Feb. 17, 2015.
Nguyen, Van-Giang et al., "SDN and virtualization-based LTE mobile network architectures: A comprehensive survey", Wireless Personal Communications 86.3, 2016, 1401-1438.
Nikaein, Navid et al., "Network store: Exploring slicing in future 5g networks", Proceedings of the 10th International Workshop on Mobility in the Evolving Internet Architecture, ACM, 2015.
Novo, Oscar et al., "Capillary Networks—Bridging the Cellular and IoT Worlds", Internet of Things (WF-IoT), 2015 IEEE 2nd World Forum on. IEEE, 2015., 2015, 1-8.
Open Networking Foundation, "TR-526 Applying SDN Architecture to 5G Slicing", Issue 1, Apr. 2016, 1-19.
Podleski, Lukasz et al., "Multi-domain Software Defined Network: exploring possibilities in", TNC, 2014.
Sayadi, Bessem et al., "SDN for 5G Mobile Networks: NORMA perspective", International Conference on Cognitive Radio Oriented Wireless Networks. Springer International Publishing, 2016.

200

MULTI-SLICING ORCHESTRATION SYSTEM AND METHOD FOR SERVICE AND/OR CONTENT DELIVERY

CROSS REFERENCE TO RELATED APPLICATIONS

This application is a continuation of U.S. application Ser. No. 16/455,180, filed Jun. 27, 2019, which is a continuation of U.S. application Ser. No. 15/590,648, filed May 9, 2017 (now U.S. Pat. No. 10,382,903). All sections of the aforementioned application(s) and patent(s) are incorporated herein by reference in their entirety.

FIELD OF THE DISCLOSURE

The subject disclosure relates to a multi-slicing orchestration system and method for service and/or content delivery.

BACKGROUND

Network providers typically offer platforms for third parties to deliver services and applications to network subscribers. Communication networks enabled by technologies such as Network Function Virtualization (NFV) and Software Defined Networking (SDN), may be flexibly organized so as to serve various customer demands. In building advanced networks, such as those to support future developments in wireless networks (including next generation, or so-called Fifth Generation (5G) wireless networks), network slicing provides the ability to create different virtual networks over which different traffic flows can travel isolated from each other. For example, a network slice can include a collection of logical network functions that support a communication service requirement of a particular network service. Accordingly, different virtual networks, or slices, can support different services, different users and/or different types of user equipment (UE).

BRIEF DESCRIPTION OF THE DRAWINGS

Reference will now be made to the accompanying drawings, which are not necessarily drawn to scale, and wherein.

DETAILED DESCRIPTION

Figure 1:
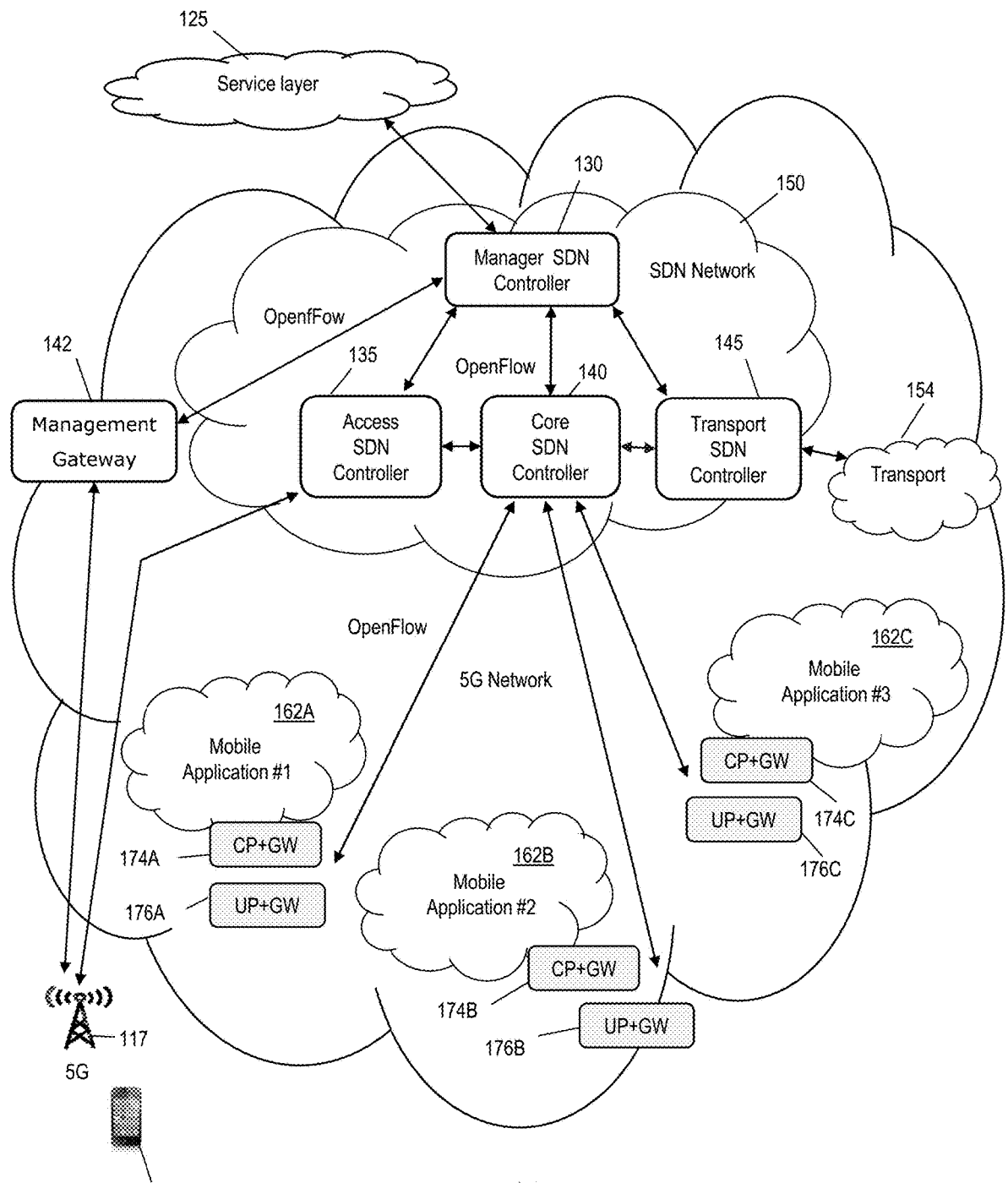
FIG. 1 depicts an illustrative embodiment of an example communication network for providing services to communication devices.

The subject disclosure describes, among other things, illustrative embodiments for managing application of multiple logical network slices in association with a mobile service request. In some instances, a so-called multi-slicing capability is provided on-demand. The multi-slicing allows access to more than one logical slice, either sequentially or in parallel, and can be based on one or more of a service type, a quality of service (QoS), a subscriber type, etc.

Multi-slicing on demand can be obtained prior to or coincident with a request for service. Alternatively or in addition, multi-slicing on demand can be provided for in-session upgrades, e.g., while engaging a particular service. In-session multi-slicing on demand can be provided while engaging a particular service, e.g., based on a condition, such as identification of a specific call, a certain period of time, a selective user or group of users, and/or in association with a particular event, a particular location, according to a particular time of day, identification of an emergency, and so on.

The multi-slicing on demand can be applied according to a policy and/or profile, e.g., enforced by a network. For example, the policy and/or profile can be based on one or more of a premium subscription, an emergency adaptation, network conditions, e.g., capacity and/or load, geolocation, e.g., of user equipment, service availability, and so on. Other embodiments are described in the subject disclosure.

One or more aspects of the subject disclosure include device, including a processing system having a processor and a memory that stores executable instructions. The instructions, when executed by the processing system, facilitate performance of operations that include detecting a first mobile device including a mobile application based on contemporaneous access of a first service function and a second service function. The mobile application communicates via a first user data traffic flow associated with the first service function and a second user data traffic flow associated with the second service function. A first logical network slice of a mobile network is identified and an association is facilitated of the first user data traffic flow with the first logical network slice of the mobile network, wherein the first user data traffic flow is conveyed by the first logical network slice. A second logical network slice of the mobile network is identified and an association is facilitated of the second user data traffic flow with the second logical network slice of the mobile network. The second user data traffic flow is conveyed by the second logical network slice contemporaneously with conveyance of the first user data traffic flow by the first logical network slice.

One or more aspects of the subject disclosure include a process including detecting, by a processing system including a processor, a first mobile device including a mobile application based on contemporaneous access by a first service function and a second service function. The mobile application is associated with a first user data traffic flow associated with the first service function and a second user data traffic flow associated with the second service function. A first network slice of a mobile network is identified by the processing system, and an association is facilitated of the first user data traffic flow with the first network slice of the mobile network, wherein the first user data traffic flow is conveyed by the first network slice. A second network slice of the mobile network is identified by the processing system, and an association is facilitated of the second user data traffic flow with the second network slice of the mobile network. The second user data traffic flow is conveyed by the second network slice contemporaneously with conveyance of the first user data traffic flow by the first network slice.

One or more aspects of the subject disclosure include machine-readable storage device, including executable instructions that, when executed by a processing system including a processor, facilitate performance of operations. The operations include detecting a first communication device having an application based on contemporaneous access of a first service function and a second service function. The application communicates via a first user data traffic flow associated with the first service function and a second user data traffic flow associated with the second service function. A first logical network slice of a communication network is identified and an association facilitated of the first user data traffic flow with the first logical network slice of the communication network, wherein the first user data traffic flow is conveyed by the first logical network slice. A second logical network slice of the communication network is identified and an association is facilitated of the second user data traffic flow with the second logical network slice of the communication network. The second user data traffic flow is conveyed by the second logical network slice contemporaneously with conveyance of the first user data traffic flow by the first logical network slice.

Referring now to FIG. 1, illustrative embodiments of an exemplary communication network for providing services to communication devices is shown. In one or more embodiments, a communications system 100 can include a Software Defined Network (SDN), or SDN Network 150. The SDN Network 150 can be controlled by one or more SDN Controllers. For example, the SDN network 150 can include a manager SDN controller 130, an access SDN controller 135, a Core SDN controller 140, and/or a transport SDN controller 145. The functions of the different types of SDN Controllers 130-145 are further described below. Each SDN controller, such as, for example and ease of illustration, the manager SDN controller 130, can be provided by a computing system executing computer-executable instructions and/or modules to provide various functions. In one or more embodiments, multiple computer systems or processors can provide the functionality illustrated and described herein with respect to each SDN controller 130-145. To simplify the description of the concepts and technologies described herein, each SDN controller 130-145 is illustrated and described herein as being provided by a single computing system. However, it should be understood that this example is illustrative and therefore should not be construed as being limiting in any way.

In one or more embodiments, each SDN controller 130-145 can include various components and/or can be provided via cooperation of various network devices or components. For example, each SDN controller 130-145 can include or have access various network components or resources, such as a network resource controller, network resource autonomous controller, a service resource controller, a service control interpreter, adapters, application programming interfaces, compilers, a network data collection and/or analytics engine. Each SDN controller 130-145 also can include or access information describing available resources and network information, such as network object statistics, events or alarms, topology, state changes. In one or more embodiment, each SDN controller 130-145 can use and/or can generate and/or access system configurations, including configurations of resources available to the manager SDN controller 130 for proving access to services.

In one or more embodiments, the communication system 100 can include a service-supporting portion, referred to generally as a service layer 125. The service layer 125 can provide access to services and/or applications, e.g., including third-party services and/or applications at a higher application layer. The service layer 125 may include capability servers, e.g., owned by or otherwise under the direction of an operator of the communication network 100, that can access and provide access to application layer servers, e.g., including application layer servers owned by third-party content providers via open and/or secure Application Programming Interfaces (APIs). Alternatively or in addition, the service layer 125 can provide an interface to a core portion of the network referred to generally as a core network. The communication network 100 can also include access to applications, such as fixed applications and mobile applications 162A-C.

In one or more embodiments, the communication network 100 can include an SDN network 150. The SDN network 150 can include one or more SDN controllers 130, 135, 140 and 145 that can provide different types of functions and can be arranged in virtual layers. For example, the SDN network 150 can include a manager SDN controller 130 that controls and coordinates functioning of the SDN network 150. The manager SDN controller 130 can be a top-level management system in the architecture. Below the manager SDN controller 130, a next level of SDN controllers 135, 140 and 145 can be instantiated and configured by the manager SDN controller 130 to provide specific classes of functionality in the architecture. For example, the manager SDN Controller 130 can provide level-3 functionality to control and coordinate service control, configuration, and data flow in the communication network 100. The manager SDN controller 130 can, as needed, instantiate, configure, and/or direct level-2 SDN controllers 135, 140 and 145 for controlling access, core, and/or transport capabilities in the communication network 100.

In one or more embodiments, the SDN network 150 can allow the communication network 100 to separate control plane operations from a data plane operations and can enable layer abstraction for separating service and network functions or elements from physical network functions or elements. In one or more embodiments, the manager SDN controller 130 can coordinated networking and provision of applications and/or services. The manager SDN controller 130 can manage transport functions for various layers within the communication network and access to application functions for layers above the communication network. The manager SDN controller 130 can provide a platform for network services, network control of service instantiation and management, as well as a programmable environment for resource and traffic management. The manager SDN controller 130 also can permit a combination of real time data from the service and network elements with real-time or near real-time control of a forwarding plane. In various embodiments, the manager SDN controller 130 can enable flow set up in real-time, network programmability, extensibility, standard interfaces, and/or multi-vendor support. In one embodiment, interactions between layers of the communication network 100 can be based upon policies to determine optimum configuration and rapid adaptation of the network 100 to changing state and changing customer requirements for example, predicted demand, addition of new users, spikes in traffic, planned and unplanned network outages, adding new services, and/or maintenance.

In one or more embodiments, each SDN controller 130-145 can instantiate a virtualized environment including compute, storage, and data center networking for virtual applications. For example, the manager SDN controller 130 can direct on-demand instantiation of network elements, such as Virtual Network Function (VNF) elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the manager SDN controller 130 can cooperate with a cloud orchestrator in instantiating level-2 SDN controllers 135-145 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network. In one or more embodiments, the level-2 SDN Controllers 135-145 can cooperate with a cloud orchestrator in instantiating VNF elements for use in, for example, the Core Network.

In one or more embodiments, a communication device 116 can operate in communication with and/or as a part of a communications network 100. The functionality of the communication device 116 may be provided by one or more server computers, desktop computers, mobile telephones, smartphones, laptop computers, set-top boxes, other computing systems, and the like. It should be understood that the functionality of the communication device 116 can be provided by a single device, by two similar devices, and/or by two or more dissimilar devices. For purposes of describing the concepts and technologies disclosed herein, the communication device 116 is described herein as a workstation or personal computer. It should be understood that this embodiment is illustrative, and should not be construed as being limiting in any way.

The communication device 116 can execute an operating system and one or more application programs. The operating system can be a computer program that controls the operation of the communication device 116. The application programs can be executable programs that are configured to execute on top of the operating system to provide various functions. According to various embodiments, the application programs can include web browsers, productivity software, messaging applications, combinations thereof, or the like. In one or more embodiments, the application programs of the communication device 116 can include applications that enable interactions between the communication device 116 and other devices or entities. In some contemplated embodiments, the application programs can provide functionality for interacting with and/or communicating with the communication network 100 and, in turn, having communications analyzed by the manager SDN controller 130 or, alternatively, any of the SDN Controllers 130-145 in the SDN network 150.

According to various embodiments, the SDN network 150 can include and/or access resources, such as a service orchestrator, a software defined network controller, a cloud orchestrator, and/or other elements. It should be understood that the manager SDN controller 130, and any of the above-described components, or combinations thereof, may be embodied as or in stand-alone devices or components thereof operating as part of or in communication with the communication network 100. As such, the illustrated embodiment should be understood as being illustrative of only some contemplated embodiments and should not be construed as being limiting in any way.

In one or more embodiments, the SDN network 150 can automatically evaluate application service requirements that have been requested from the communication system 100. In one embodiment, a service request can be received from a subscriber, or customer, or customer device. For example, a request can be receive via a portal. The service request can be provided to the soft manager SDN controller 130 for service creation, instantiation, and management. According to various embodiments, the service request can be analyzed by the manager SDN controller 130. In one embodiment, the manager SDN controller 130 can access or query the service layer 125 to determine service requirements needed for fulfilling the service request.

In one or more embodiments, a service request can be received by equipment of a subscriber or customer (e.g., via the portal), and provided to the SDN network 150 for service creation, instantiation, and management. The service request can include application objects and/or requests for particular services or functions. Thus, the service request can include objects that define service functions that are desired, requests for generation of services and/or requests for particular functionality, queries, combinations thereof, or the like. It should be understood that these examples are illustrative and therefore should not be construed as being limiting in any way. According to various embodiments, the service request can be analyzed by the SDN controller 130-145 and a set composed of a directed graph and the associated model or model files are selected. The model can define features of the service and can generate in a programming language or format such as XML, Yang models, other types of files, combinations thereof, or the like. The selected directed graph can be used at runtime to fill in the event-specific details from the API, the resource allocations per the directed graph and the resource model, and one or more state changes in the network through the adapters.

In one or more embodiments, the communication device 116 can communicate with the communication network 100 via a wireless communication link. For example, the communication device 116 can be a mobile communication device 116 that communications via a cellular communication link through a Radio Access Network (RAN) technology. A mobility network 117, such as a 3GPP wireless network, e.g., an LTE network or a 5G network, can establish wireless communications with the communication device 116, where the communication device 116 can move from cell to cell, while maintaining a communication session. In another example, the communication device 116 can communication with the communication network via a non-3GPP wireless link, e.g., a WiFi network link. The WiFi network can be, for example, a local area network (LAN) that is supported by a router capable of wireless communications or can be an individual device, such another mobile communication device 116 capable of acting as an intermediary (e.g., a Hot Spot). In one or more embodiments, the communication network 100 can be a converged network capable of supporting a wide range of access, core and transport networks, such as wireline, wireless, satellite, 3GGP, non-3GPP, and/or 5G. It is understood that the radio frequency spectrum used in wireless access can include licensed spectrum, unlicensed spectrum and combinations thereof.

In one or more embodiments, a Management Gateway (MGW) 142 can be included in the communication network 100. The MGW 142 can capture traffic entering the communication network 100 from various communication devices 116 and/or various Access Networks (AN) 117. The MGW 142 can communicate with the SDN network 150, e.g., with the manager SDN controller 130, regarding traffic entering the communication network 100. In one embodiment, the MGW 142 and the manager SDN controller 130 can communicate via a communications protocol, such as an OpenFlow® protocol that provide access to a forwarding plane of a network device, such as a switch or router, over a network. OpenFlow® is a registered trademark of the Open Networking Foundation of Palo Alto, Calif. The MGW 142 can inform the management SDN controller 130 of information regarding services sought by one or more communication devices 130. The management SDN controller 130 can analyze these services to determine service functions and/or network data flows that would be required to facilitate delivery of these services to the communication devices 116.

In one or more embodiments, the manager SDN controller 130 can query the service layer 125 to determine the functional and/or resource requirements to provide the service to the communication device 116. In one or more embodiments, the service requirements can include service feature data. In one or more embodiments, this service feature data can be generated by or provided to the service layer 125 and/or the manager SDN controller 130 via interactions between the communication device 116 and the portal. For example, in the process of making the service request, the communication device 116 can make a series of selections from menus, drop-down lists, fields, tables, or other data or object selection mechanisms that may be provided by the portal and/or the application programs executing on the communication device 116. In some embodiments, the application programs can include a web browser application and/or other application that can obtain data from the portal. In one or more embodiments, the application programs can use the data to generate and present a user interface at the communication device 116. The user interface can include possible service features, and a user or other entity can select the desired features, drag and drop desired features, and/or otherwise indicate desired features in a service.

In one or more embodiments, the manager SDN controller 130 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the manager SDN controller 130 can determine from the service model one or more physical network functions or other resources that will be needed or used to support the service. The manager SDN controller 130 also can analyze the service model to identify one or more virtual network functions or other functions that will support or provide the features of the service. The manager SDN controller 130 also can determine, via analysis of the service model, process flows between the various resources and/or functions used to support or provide the service features.

In at least some embodiments, the SDN network 130 implements a multiple level, dynamic design by which the manager SDN controller 130 of the SDN network 150 can automatically prioritize and instantiate a next lower level (e.g., level-2) SDN controller including one or more of an access network SDN controller 135, a core network SDN controller 140, and/or a transport network SDN controller 145. It is understood that such actions can be undertaken on the fly, e.g., at runtime, responsive to network activity, responsive to particular requests, in a course of normal network operations, configuration, management, and the like. Generally, the manager SDN controller 130 can instantiate at least one set of these level-2 SDN controllers 135-145 to provide baseline functionality and connectivity for a least one communication device 116. As server requests are processed, the manager SDN controller 130 can evaluate the service request requirements, i.e., the service features, and compare the required resources and capacities for these resources with the resources and capacities currently available at the SDN network 150 via the level-2 SDN Controllers 135-145.

In one embodiment, the manager SDN controller 130 can communicate with each of the instantiated SDN controllers 135-145 via a communication interface, such as an interface that applies OpenFlow® data network protocols. In addition, the SDN controllers 135-145 of level-2 to can communicate among themselves to determine resource capabilities, capacities, shortages, failures, and/or warnings. In one or more embodiments, if the manager SDN controller 130 determines that the requested service can be performed, within system margins, using the currently instantiated SDN controllers 135-145, then the manager SDN controller 130 can decide to direct the SDN controllers 135-145 to perform the service for the communication device 116. Alternatively, if the manager SDN controller 130 determines a shortage or shortfall in a needed resource, then the manager SDN controller 130 can direct instantiation of one or more new SDN controller 135-145 to perform all or part of the requested service. For example, the manager SDN controller 130 may determine that the service request associated with the example communication device 116, or many communication devices 116, or merely received at the communication network 110 from an indeterminate device (e.g., a request for resources from another network) requires additional core SDN controller capacity 140. In this case, the manager SDN controller 130 can direct the instantiation of additional core SDN controller 140 capacity from a set of configurable SDN controller devices at the cloud.

In one or more embodiments, level-2 SDN Controllers 135-145, including access SDN controller 135, core SDN controller 140, and transport SDN controller 145 can control devices at an upper level, e.g., level-1, of the communication network 100. For example, the access SDN controller 135 can control, direct, configure, and monitor access resources 117 and 119 for the network 100, such as eNodeB controllers, RAN controllers, and or WiFi controllers. In another example, the core SDN controller 140 can control, direct, configure, and monitor core resources 174A-176C for the core network of the communication network 100, such as Gateways (GW) for Control Plane (CP) 174A-C, User Plane (UP) 176A-C, and/or legacy (i.e., combined user and control plane). In another example, the transport SDN controller can control, direct, configure, and monitor transport layer services 154, such as a Multiprotocol Label Switching (MPLS) network, Fiber Optics network, and/or a Backbone network.

In one or more embodiments, the manager SDN controller 130, adapted to support level-3 functionality, can manage one or more sets of level-2 SDN controllers 135-145 in the SDN network 150. The manager SDN controller 130 can configure and/or reconfigure the instantiated SDN controllers 135-145 to optimize the SDN network 150 according to loading created by the service requests. For example, the manager SDN controller 130 can invention automatically instantiate multiple levels of fully distributed SDN controllers 135-145. Likewise the level-2 SDN controllers 135-145 can instantiate and/or configure and/or reconfigure VNF elements 174A-176C at level-1. Each of the SDN controllers 130-145 can support instantiation "on the fly" based on new requests, the ending of old requests, monitoring network traffic, and/or requesting loading information from any of the other SDN controllers 135-145 and/or the VNF elements 174A-176C.

For example, the manager SDN controller 130 can instantiate and/or decommission SDN controllers 135-145 into and out from the SDN network 150 on an on-going basis according to the exchange-to-exchange (E2E) application service requirements. Similarly, the SDN controllers 135-145 can instantiated and/or decommission and/or reconfigure VNF elements 174A-176C. For example, in a streaming media application, such as a Netflix™ Video Delivery application, the manager SDN controller 130 can determine that network demands for the access SDN controller 135 and transport SDN controller 145 may be relatively large for a given set of communication devices 116, while the core SDN controller 140 demands for these communication devices 116 may be relatively normal. The manager SDN controller 130 can look at the available resources and capacities for the currently instantiated SDN controllers 135-145 that are support these communication devices 116. If the demands of the media streaming application exceed the available resources, then the manager SDN controller 130 can automatically address the issue by, for example, instantiating additional access SDN controller 135 and transport SDN controller 145 resources.

In one or more embodiments, the manager SDN controller 130 may determine that sufficient resources exist at the currently instantiated access SDN controller 135 and transport SDN controller 145 resources, however, the priorities of these resources need to be adjusted. For example, where a heavy streaming media loading is identified, the access SDN controller 135 and transport SDN controller 145 resources may be given higher priority in comparison to the core SDN controller 140. Conversely, if a heavy loading of Voice over IP (VoIP) services is identified, then the manager SDN controller 130 can automatically place the core network SDN controller 140 into higher priority in comparison to access network SDN controller 135 and transport network SDN controller 145.

In one or more embodiments, a SDN-controlled network, using network function virtualization, software defined networking, and/or cloud-based concepts, can provide flexibility in number, type and/or configuration of virtual networks, sometimes referred to as flexible network slicing. Network slicing facilitates distributed functionality, e.g., to support diverged types of services and requirements, such as those supporting future developments in wireless networks including 5G networks. SDN controllers 130 can provide control and configuration to support different network slices on appropriate network slices or clouds 162A-C by instantiating and controlling a proper sets of VNF elements 174A-176C and by the optimal distribution of these VNF elements 174A-176C based on application and service requirements.

Generally speaking, network slicing is a network management technique in which compute and/or connectivity resources in a communications network are divided to create a set of different virtual networks. For example, network slices can be supported by virtual network functions instantiated upon generic computing resources to provide specific network functions. Without limitation, network slices can be used in one or more of a core network, a radio access network, a backhaul network. Isolation provided by the network slices can be applied to different operators, different types of services, different types of network traffic, different users and/or classes of users, and the like.

In one or more embodiments, network slicing can be used by the SDN network to support multiple virtual networks behind the air interface(s) 117 of the communication network. The slicing of the network into multiple virtual networks can provide optimal support for different Radio Access Networks (RAN) and/or different service types running across a single RAN. Further, in one or more embodiments, flexible distribution of the access, edge, and core elements of the network cloud can provide optimal support regarding latency and/or service isolation for different apps and service requirements. Connectivity between computing resources can be allocated so that traffic of one slice can be isolated from that of another. Isolation can be based on one or more of network operator, service, application, user, user equipment, level of subscription service, and so on. By way of example, one slice can be configured to suit the needs of a Machine Type Communication (MTC) service, which typically generate large numbers of short transmissions that do not require ultra-reliable connections. Another slice can support Mobile Broadband (MBB), or enhanced Mobile Broadband (eMBB) services, having different requirements. Network slices created to serve the needs of different services may be built upon the resources allocated to a network operator within a slice that isolates the network operator from other network operators on a set of resources associated with a service provider.

In one or more embodiments, the SDN Network 150 can determine what service(s) is being used and which external network and/or network operator, e.g., by way of an Access Point Node (APN), is being used for the specific traffic. In one embodiment, the analysis can be performed by a SDN controller 130-145, which derive information either directly from communications entering the network 100 form one or more communication devices 116 or from a MGW 142 that is monitoring this type of traffic. In one or more embodiments, a SDN Controller 130 can perform analysis that determine a detailed granularity of the specific services being sought by or provided to the communication device 116. This detailed granularity can reveal sets of service functions (e.g., identifying servers, providing connections to applications, verifying authenticity, providing control plane and user plane functions) that are necessary for facilitating the delivery of services. The detailed granularity can also include determining various data pathways, within the network 100 and beyond, necessary for facilitating the delivery of services. The SDN Controller 130 can instantiate VNF elements 174A, 176A that can cause traffic to be sent to respective destinations such as 4G, 4G+, or 5G APNs, based upon breaking up the specific services requested into the types of service functions, resources, data accesses, and/or network data paths. The VNF elements that are composed, configured, and chained by the SDN Controller 130 for implementing the necessary service functions are, in turn, instantiated into the 5G network 100 in network locations that optimize one or more characteristics of the service functions and/or network data paths.

Examples of flexible, adaptive networks, such as the illustrative example communication network 100, are disclosed in commonly owned, U.S. patent application Ser. No. 15/344,692, entitled "Method and Apparatus for a Responsive Software Defined Network," filed on Nov. 7, 2016, and incorporated herein by reference in its entirety. Additionally, techniques related to dynamic network routing in a software defined network are disclosed in U.S. patent application Ser.

No. 15/351,618, entitled "Method and Apparatus for Dynamic Network Routing in a Software Defined Network," filed on Nov. 15, 2016, and also incorporated herein by reference in its entirety.

Figure 2:
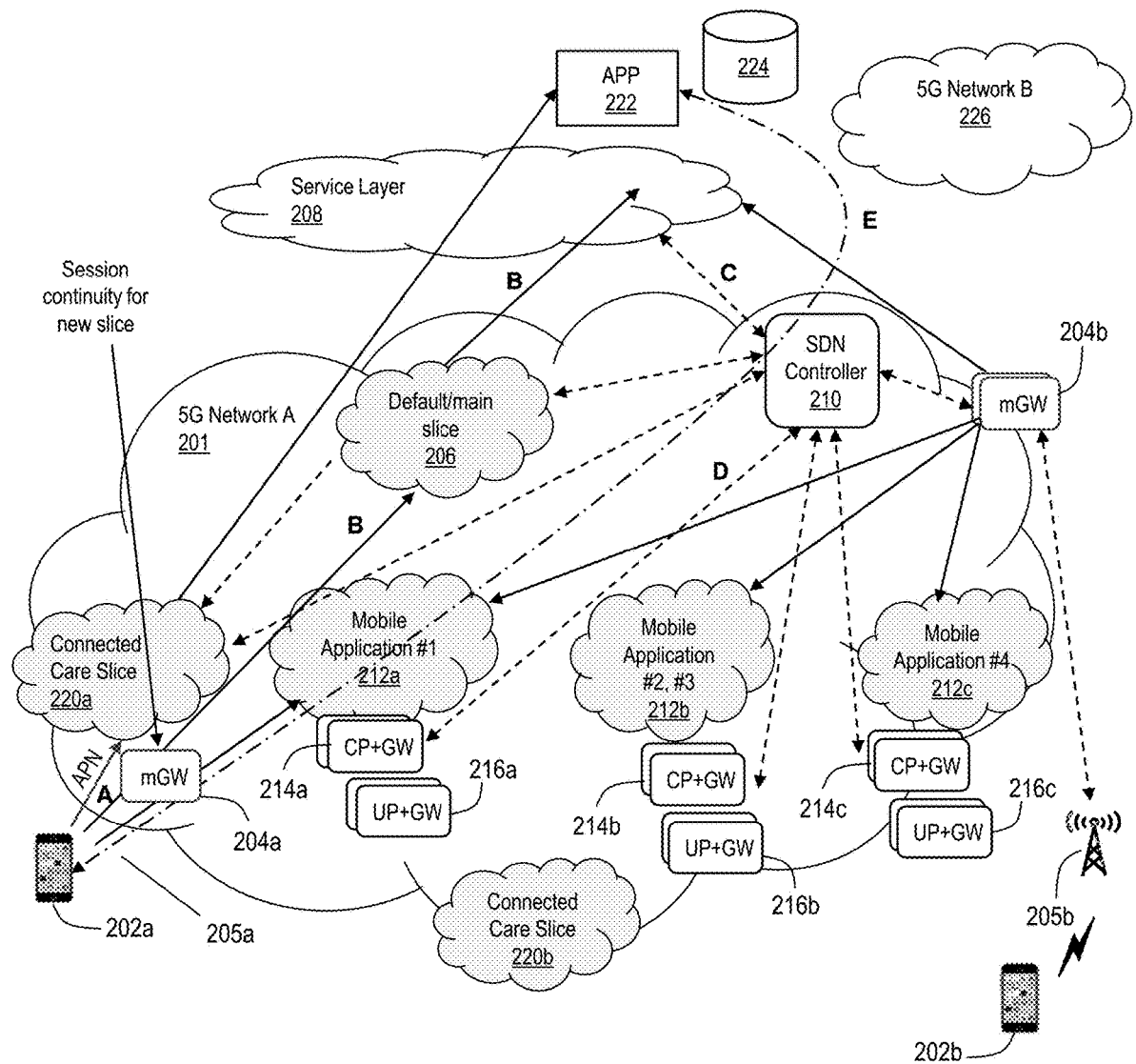
FIG. 2 depicts an illustrative embodiment of another example communication network for providing services to communication devices.

FIG. 2 depicts an illustrative embodiment of another example communication system 200 for supporting applications and/or services to fixed and/or mobile user equipment (UE). The communication system 200 includes a first mobility network 201 that provides access to applications and/or services to mobile communication devices 202a, 202b, generally 202. In some embodiments, the communication system 200 can include other mobility networks, such as a second 5G mobility network 226, e.g., of a competitor. The first mobility network 201 uses management gateways 204a, 204b, generally 204, to capture traffic entering the communication network 201 from various UE 202 and various access networks 205a, 205b, generally 205. The management gateway 204 can communicate with a software defined network, e.g., in cooperation with an SDN controller 210, regarding traffic entering the first communication network 201. In one embodiment, the management gateway 204 and the SDN controller 210 can communicate via a communications protocol, such as an OpenFlow® protocol that provide access to a forwarding plane of a network device, such as a switch or router, over a network. The management gateway 204 can inform the SDN controller 210 of information regarding application services sought by the one or more UEs 202. The SDN controller 210 can analyze these application service requests to determine service requirements, e.g., service functions and/or network data flows that would be required to facilitate delivery of the requested application services to the UE 202. These analyses can be accomplished by the SDN controller 210 alone, or in combination with one or more of a service layer 208 and/or the management gateway 204.

In at least some embodiments, the first mobility network 201 includes multiple network clouds, or slices 212a, 212b, 212c, generally 212. Network slices 212 can be supported by virtual network functions that are instantiated upon generic computing resources to provide specific network functions. Network slices 212 can be created, configured, used, reconfigured, and in at least some instances decommissioned or retired, as needed to serve the needs of one or more requested services. In at least some network architectures, such as 5G, each network slice 212 can be adapted to separate control plane operations from user plane operations, e.g., by separately processing control or signaling plane traffic and user or data plane traffic. Generally speaking, the control plane traffic can be used to access, coordinate and/or otherwise manage establishment and/or usage of the user plane traffic. Separation of the control plane from the user plane within a network slice allows the control plane to coordinate updates, modifications or changes to user plane traffic being processed by the network slice.

In some embodiments, the first mobility network 201 includes a default network slice 206, sometimes referred to as a main slice. The default slice 206 can be established during attachment and/or activation of a UE 202 to the mobility network, similar in at least some sense to a default bearer established in 4G LTE networks. The default slice 206 can be associated with a UE 202 when the UE 202 is first powered on within communication range of an access network 205a of the mobility network 201. Alternatively or in addition, the default slice 206 can be established, allocated to or otherwise associated with the UE 202a when the UE 206a roams into the communication range of the access network and/or is a subject of a handover from another access network 205b, including other access networks of the same mobility network 201 or other mobility networks 226. Other mobility networks 226 can include another mobility network 226 of a common mobility network service provider, e.g., according to a different architecture, such as 2G, 3G, 4G. Alternatively or in addition, other mobility networks 226 can include networks of a different network service provider, including networks of a similar, e.g., 5G, and/or different architecture.

The network slices 212, once provisioned, can facilitate access by the UE 202a to applications and/or service functions. The applications and/or service functions can include network functions provided by a network service provider, other service provided by a service provider that may be the same or different from the network service provider. In at least some instances, the application and/or service can be provided over the top, e.g., by a third party independent from either the network service provider or the service provider. The illustrative example includes an example application 222 that can be accessed via the resources of the mobility network 501 according to the network slicing techniques disclosed herein.

In general, access can be facilitated by a service layer 208. The service layer 208 is configured to facilitate access to services and/or applications, e.g., including third-party services and/or applications 222 at a higher application layer. The service layer 208 also provides an interface to a core portion of the network referred to generally as a core network.

It is understood that in some scenarios, a service is provided to a single user equipment (UE) 202a. Examples include services that can be delivered by a network source, such as mobile television, video on demand, web surfing, mail service, and the like. Alternatively or in addition, the service can include more than one UE 202a, 202b. Examples of multi-UE services can include, without limitation, voice calling, e.g., VoIP, video conferencing, messaging, gaming, and the like, that engage the multiple UEs 202a, 202b in a common or otherwise shared application and/or service.

One or more of network access and/or services access can be based on one or more of a service type, a quality of service (QoS), a subscriber type, a level of subscription, and the like. A first subscriber may subscribe to a voice service without messaging and/or without a high-quality video service, whereas a second subscriber may subscribe to the same voice service and the high-quality video service. Information related to and/or indicative of subscribed services can be include in a policy and/or rules. Such polies or rules can include, without limitation, network policies, subscriber and/or equipment policies. Network policies can include one or more of network engineering rules that can include policy type rules imposed by a network operator, regulatory rules imposed by a regulating body, and/or equipment based rules on physical network resources. Subscriber policies can be associated with each particular subscription. Examples include Service Level Agreements (SLA) that identify obligations of a network and/or service provider based on a particular level of subscription. Subscriber policies can include, without limitation, location restrictions (e.g., locations at which the services are allowed or not allowed), bandwidth ranges, time restrictions (e.g., times of day, days of week, or other times at which the service is allowed or not allowed), security restrictions or policies, data limits, combinations thereof, or the like.

As network slices 212 can provide access to different services, applications and/or levels of service, it is understood that access to certain network slices can be allowed and/or restricted based on any of the foregoing policies. Accordingly, one or more of the SDN controller 210, the management gateways 204 or the service layer 208 identifies policies that apply to delivery of services and/or access to network slices.

It is understood that one or more of the access networks 205 and/or the other mobility networks 226 can include operation within licensed portions of the radio frequency spectrum. Such licensed operation includes 3GPP networks, such as 2G, 3G, 4G, and 5G. It is further understood that one or more of the access networks 205 and/or the other mobility networks 226 can include operations within unlicensed portions of the radio frequency spectrum. Such unlicensed operations can include 3GPP networks supporting unlicensed spectrum operation, e.g., 5G and/or other non-3GPP architectures, such as IEEE 802.11 wireless networks, WiFi, Bluetooth, and so on.

The example mobility network 201 includes a group of network slices, including a first network slice 212*a*, that supports a first mobile application service requirement, a second network slice 212*b* that supports second and third mobile application service requirements, and a third network slice 212*c* that supports a fourth mobile application service requirement. Each of the mobile devices 202 and the network slices 212*a*, 212*b*, 212*c*, generally 212, is in communication with at least one of the management gateways 204.

The SDN Controller 210 alone or in combination with the service layer 208 can instantiate the first network slice 212*a*, such as VNF elements 214A, 216A, respectively supporting control plane operations and data plane operations. The VNF elements 214A, 216A can cause control plane and/or user plane traffic to be sent to respective destinations such as 4G, 4G+, or 5G APNs, based upon breaking up the specific services requested into the types of service functions, resources, data accesses, and/or network data paths. Likewise, second and third network slices 212*b*, 212*c* are instantiated using VNF elements 214B, 214C, 216B, 216C. The VNF control plane elements 214A, 214B, 214C, generally 214 and the VNF user plane elements 216A, 216B, 216C, generally 216, can be composed, configured, and/or chained by the SDN Controller 210 and/or the service layer 208 for implementing one or more corresponding service functions. The VNF elements 214, 216 are, in turn, instantiated into the 5G network 210 in network locations that facilitate one or more characteristics of the service functions and/or network data paths.

It is understood that some network slices 212 provide multiple service functions, wherein each service function can be provided according to a predetermined requirement, such as a minimum acceptable level of service, above some minimum threshold requirement, e.g., quality, reliability, packet loss, error rate, signal level, delay, bandwidth, or the like. It is understood that some embodiments, a service requested by a UE 202 may include multiple, different services. The multiple different services may be dependent on the user application, such as a home security service that may provide streaming video of a user's home to a mobile device of the user, as well as message service to a security operations center and/or local emergency services, such as police or fire. Other examples include, without limitation, health care applications, such as connected care applications that monitor biometric information of a user, evaluate the user's physical condition based on the monitored data, provide reporting to supervising physicians and/or medical centers, and in at least some instances, contact emergency services upon detection of a medical emergency. The example network includes example connected care slices 220*a*, 220*b*, generally 220, configured to support delivery of such services. It is understood that certain features of the different services, video versus text messaging, can be satisfied by different network connectivity, such as different bandwidths, different reliabilities, and the like.

Although video of a home security system may require a greater bandwidth than text messaging, the video service can be acceptable when subject to short delays and/or interruptions. Consider another application in which a first surgeon is performing an operation in consultation with other surgeons at a remote location by way of a mobile application. The application may include video services, e.g., reflecting progress of the operation, as well as voice services and/or messaging services. Still other services can include data exchange services, e.g., to allow for remote monitoring and/or control of medical devices. It is apparent that network resources designated for the latter example would require a much greater degree of reliability, and perhaps bandwidth, and the like.

In at least some instances, it can be left up to network service providers to determine how network resources are configured and shared according to network slicing. To this end, it is understood that some network slices can be general, in at least some sense, providing more than one service, such as video, voice and/or text messaging, to according to a first set of service requirements, whereas other network slices can be specific, e.g., dedicated to a single service and/or group of services. Alternatively or in addition, other network slices that accommodate multiple services can do so to a different set of service requirements.

Continuing with the example, a first UE 202*a* can attach to the first 5G network 201, being associated with a default slice 206. The first UE 202*a* can initiate a service request for service creation, instantiation and/or management. The request can be submitted to a first management gateway 204*a* that captures traffic entering the communication network 501 from the first UE 202*a*. Upon initial request (A) from subscriber UE 202*a*, the management gateway 214*a* forwards the service request to the service layer 208, e.g., via the default slice 206 (B). The service layer 208 can include a service layer cloud network configuration. Once the service and service requirements, e.g., QoS, and subscriber type, e.g., enterprise, individual, have been identified, the service layer 208 sends a command to the SDN Controller 210 (C) and/or the management gateway 204*a* to associate the correct slice 204*a* (D) to establish a forwarding of traffic, both control plane and user plane (E), to the correct slice 212*a*.

The SDN controller 210 accesses or queries the service layer 208 (C) to determine service requirements needed for fulfilling the service request, including determining any functional and/or resource requirements to provide the service to the UE 202*a*. The SDN controller 210 alone or in combination with one or more of the management gateway 202*a* and/or the service layer 208, analyzes any related policies. This can include any of the foregoing policies, e.g., network policies, subscriber policies, SLAs, and the like. The SDN controller 210 instantiates, configures and/or reconfigures VNF elements of a network slice 212*a* (D). In at least some embodiments, the VNF elements can be composed, configured and/or combined, e.g., chained, for implementing the appropriate service functions. It is understood that the process determines a detailed granularity of the specific services being sought by the UE 202*a*. The detailed granularity can reveal sets of service functions (e.g., identifying servers, providing connections to applications, verifying authenticity, providing control plane and user plane functions) that are necessary for facilitating the delivery of services. In the illustrative example, the requested service can include network access (E) to the application 222 via the first network slice 212a.

Figure 3A:
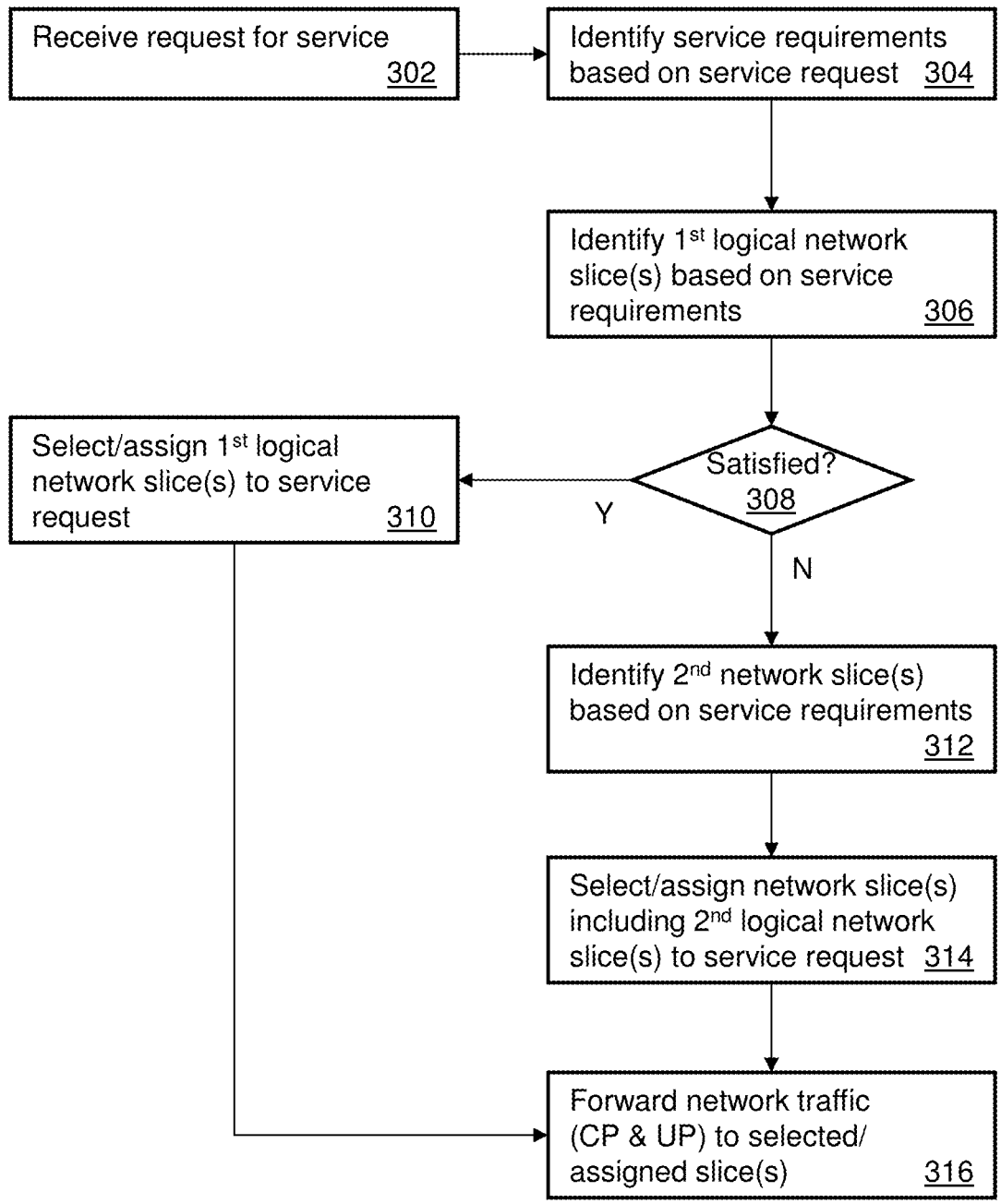
FIGS. 3A-3B depicts illustrative embodiments of processes for managing network resources used in portions of the system described in FIGS. 1 and 2.

FIG. 3A depicts an illustrative embodiment of processes 300 for managing network resources used in portions of the system described in FIGS. 1 and 2. A request for service is received or otherwise detected at 302. The request for service can be initiated by a communication device, such as a UE 202 (FIG. 2), and/or via another location, such as a web site or portal. It is understood that the request can include an initial request, e.g., a first request from a recently attached UE 202 and/or a new request from a previously attached UE. Alternatively or in addition, the request can include a request for a change to an existing service, e.g., in a dynamic sense, as in an upgrade to a lever of service. By way of example, an upgrade might include a small-screen video streaming service to a large-screen or high resolution video streaming service. Alternatively or in addition, an upgrade might include adding streaming video to an existing VoIP call to provide a videoconferencing service.

The service requirements are identified at 304 based on the service request. In at least some embodiments, the request for service can include one or more application objects and/or requests for particular services or functions. Such service feature data can be generated by or provided to a service layer 208 and/or an SDN controller 210 (FIG. 2) via interactions between the UE 202 and/or the portal. The service features can include requirements of a subscriber and/or a particular UE device. Without limitation, example service features include an identification of a service type, e.g., security, authentication, streaming media, a related QoS, a subscriber type, e.g., an enterprise subscriber or an individual user, and the like.

A first logical network slice is identified at 306 based on service requirements. The first network slice can be a pre-existing slice 212 or group of slices. Such pre-existing slices may have already been instantiated for prior usage by the same subscriber associated with the requesting UE. Alternatively or in addition, pre-existing slice(s) may have been instantiated previously in anticipation of similar requests, or responsive to similar request from other UEs and/or subscribers. In at least some embodiments, the first slice can include multiple slices, e.g., in a chained arrangement, as may be required to satisfy the requested service.

A determination is made at 308, as to whether the service requirement is satisfied by the first logical network slice(s). To the extent that the service requirement has been satisfied, the first logical network slice or group of slices are selected and/or assigned to the service request at 310. Network traffic, including control plane and user plane traffic, are forwarded by way of the selected and/or assigned slice(s) at 316. It is understood, generally, that separation of the control plane from the user plane allows the control plane to facilitate a re-configuration and/or change of a slice(s) already forwarding user traffic, without interrupting the forwarding of the user traffic. User traffic can be redirected and/or modified as required after any reconfiguration coordinated by the control plane.

To the extent that the service requirement has not been satisfied, a second network slice or group of slices can be identified at 312. The second network slice(s) can be identified based on the original service requirements or on a subset of the original service requirements that are not satisfied by the first network slice(s). Identification of the second slice(s) can be accomplished by one or more of the service layer, the SDN controller, the management gateway, e.g., as disclosed above.

Once identified, the second network slice(s) can be selected and/or assigned at 314 to fulfil all or part of the requirements of the requested service. In some embodiments, the first network slice(s) handle first portion of control plane and/or user plane traffic, while the second network slice(s) handle a second portion of the control plane and/or user plane traffic associated with the same requested service by the same UE. For example, if a requested service requires service functions A+B+C, and the first network slice(s) can provide A+B but not C, then the second network slice(s) can be employed to provide service function C, such that collectively, the first and second network slices provide all three types of service functions.

Alternatively or in addition, it may make sense to allow the second network slice(s) to provide all of the service functions, e.g., A+B+C, instead of sharing functions across the first and second network slices. In this example, the second network slice(s) can be used instead of the first network slice(s). To the extent this occurs during an initial request for service, it is possible that the first network slice(s) do not carry any related traffic. To the extent this occurs dynamically, e.g., during a delivery of services to the UE using the first network slice(s), then the control plane can be used to transfer all traffic to the second network slice(s). To the extent that a traffic flow of the first network slice(s) are modified, the first network slices can be re-configured and/or decommissioned.

In an alternative scenario, the first network slice(s) can be reconfigured to change from providing service functions A+B to providing only service function A, while allowing the second network slice(s) to provide service functions B+C. It is understood that other scenarios are possible in which traffic can be initially established and/or dynamically re-configured on one or more different network slices.

It is further understood that any of the network service functions may be associated with policy requirements and/or restrictions. Accordingly, a particular request for service may be accommodated by a first network slice or a second network slice, with the second slice providing a superior level of service than the first. Depending upon the policies/restrictions, access to the second network slice may be restricted or prohibited. In such instances, one or more of the network, a network operator and/or a service provider can be notified as to the request, the identified slice(s) and any access restrictions. In some instances, a modification to the policy and/or authorization or access restrictions can be initiated to facilitate a provisioning of the otherwise restricted network slice(s). Such granting of access can be performed on a temporary basis, e.g., for a limited duration, in association with a special event, e.g., a sporting event, an emergency adaptation, a geo-location, a service availability, and the like.

It is further understood that any granting of access can be accomplished unilaterally, e.g., without notifying or requiring feedback from a subscriber. Alternatively or in addition, it is contemplated that granting of access can be made conditional, e.g., responsive to acceptance of an offer extended to the subscriber to invoke the access authorization. For example, a subscriber can request a service and receive a notification that the request is not supported based on a present subscription level, or that the request, although supported, could benefit from an enhanced service not currently available based on the present subscription level. The offer might allow a subscriber to modify they subscription, e.g., temporarily, for cost, or in association with a marketing effort, or the like. In at least some instances, extension of and/or acceptance of the offer can change the subscriber's SLA in a manner that allows access to the second network slice(s).

The process 300 can receive and change a destination subscriber SLA. For example, when a calling party, either prior to call or while talking to a called party can receive an indication of coverage and from a subscriber information repository, such as a Home Subscriber Server (HSS), the subscriber profile, class and/or QoS can be identified for the particular subscriber, e.g., the called party. The calling and/or called party can dynamically pay for an increase the SLA, allowing for or otherwise initiating movement of the call (a call being placed or an existing call being upgraded) to a superior slice. The superior slice can be obtained for an improved connection, e.g., for that particular call only, for a certain period of time or according to some other requirement. Such upgrades or modifications can be accomplished for an individual, or for a family plan. For example, a reporter talking to a private subscriber can, while talking, pay for a premium service/connection in 5G network to allow the existing service to be upgraded during delivery of the service being upgraded.

It is envisioned that in at least some scenarios, a requested service depends upon a policy of a subscriber and/or UE other than the requestor. For example, if a first subscriber requests a service to stream high definition video from the first subscriber's UE to another subscriber's UE, the service may require authorization of the second, recipient UE to receive the service. To the extent any policy deficiency is associated with the second, e.g., recipient party, the offer can be extended to the second subscriber, to the first subscriber, or to both the first and second subscribers. In some aspects, provisioning of access of the recipient's UE to the requested service is based on acceptance of an offer and/or payment by the first subscriber, e.g., as in a collect toll call. Once the applicable slices have been provisioned or otherwise configured, network traffic, including control plane and user plane traffic, is forwarded to the selected and/or assigned slice(s) at 316.

Figure 3B:
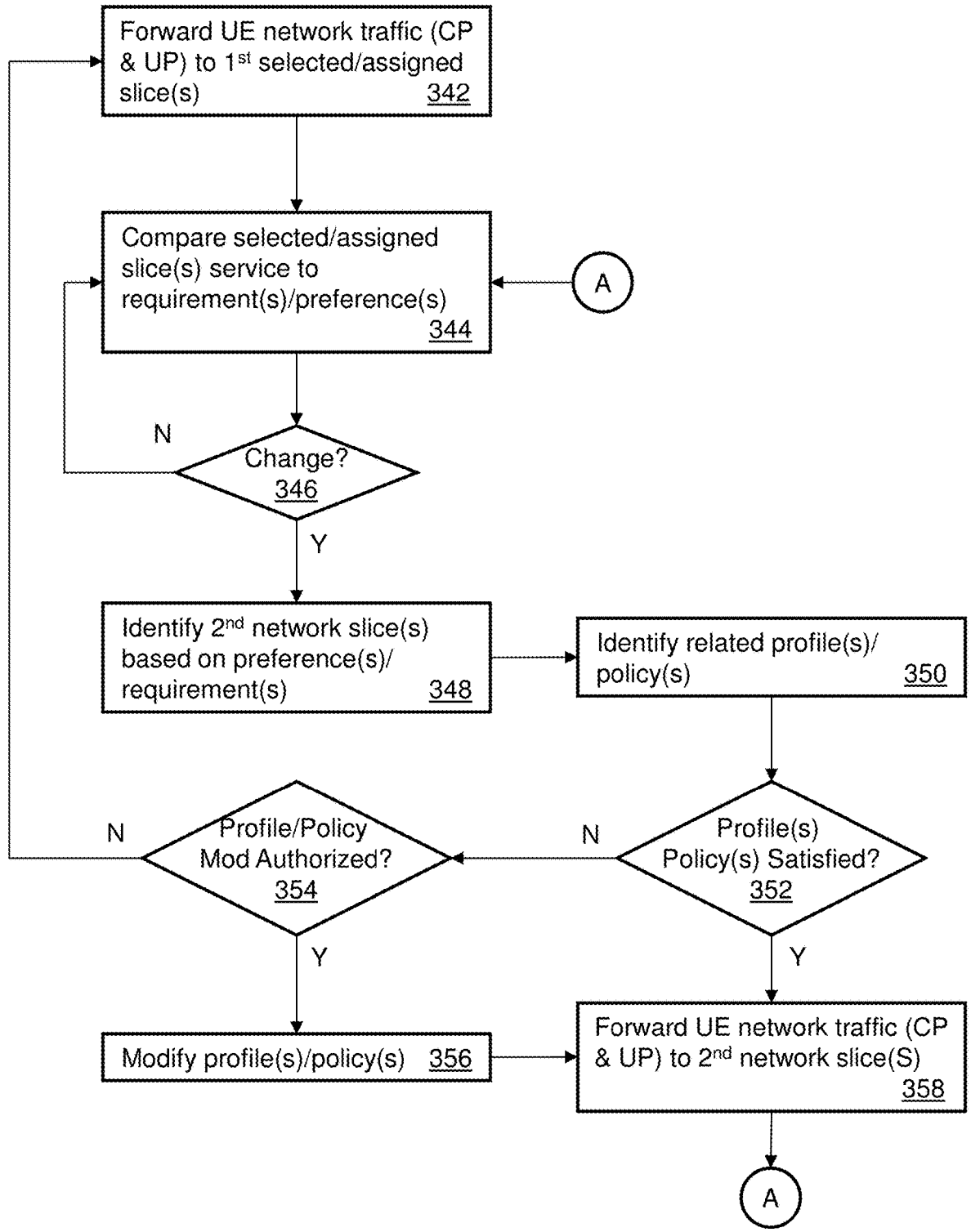

FIG. 3B depicts an illustrative embodiment of another processes 340 for managing network resources used in portions of the system described in FIGS. 1-2.

Network traffic associated with a service requested by a UE, including control plane and user plane traffic, are forward to a first logical network slice or group of logical network slices at 342 of a communication network 100, 200 (FIGS. 1-2). In general, the logical network slice(s) provide one or more service functions that support application service requirements associated with a service requested by the UE. Service functions of the selected and/or assigned logical network slice(s) are identified and compared at 344 to service to requirement(s) and/or preference(s) associated with the requested service.

To an extent that a determination is made at 346 that the service functions of the selected/assigned network slices satisfy the service requirements/preferences of the requested service, network operation continues. Namely, the control plane and user or data plane operations continue according to the selected/assigned network slices. However, to an extent that a determination is made at 346 that the service functions of the selected/assigned network slices do not satisfy the service requirements/preferences of the requested service, a second logical network slice or group of slices is identified at 348.

In some embodiments, a repeating of steps 344 and/or 346 can be done periodically, e.g., according to time period. Alternatively or in addition, the steps 344 and/or 346 can be initiated in response to an event, such as detection or receipt of a change request, and/or determination of an emergency. Still further, one or more of steps 344 and 346 can be performed responsive to network conditions, e.g., in response to capacity and/or load surpassing some predetermined threshold, in response to identification of service availability, UE conditions, UE locations, and the like.

Responsive to identifying the second network slice(s), one or more profile(s) and/or policy(s) are identified at 350. The profile(s)/policy(s) are associated with one or more of the second network slice(s), the UE and/or a subscriber identification of the UE that requested the service. In at least some embodiments, the profile(s)/policy(s) can include a service type, a QoS and/or a subscriber type, e.g., an enterprise subscriber, an individual subscriber, a family member subscriber. The profile(s)/policy(s) can include exact values, ranges, thresholds, or combinations thereof.

A determination as to whether the profile(s)/policy(s) are satisfied is made at 352. The determination can be based on one or more of a subscriber identity, a subscriber membership, a level of subscription, a UE type. Alternatively or in addition, whether the profile(s)/policy(s) are satisfied can be based on one or more of a specific event, a specific location or range of locations, a specific network condition, e.g., capacity and/or load, a time of day, a period of time, a date, an emergency, and the like. To an extent that the profile(s)/policy(s) are satisfied at 352, network traffic including control plane and data or user plane operations supporting the requesting UE are exchanged at 358 by way of the second network slice(s).

The process 340 can continue from step 344, once again comparing selected/assigned slice(s) service to requirement(s)/preference(s). It is envisioned that service requirements and/or preferences can change. For example, such changes can occur during an existing service based on a user request, an application requirement, network conditions, or some other factor that results in a disagreement between the service functions provided by the selected/assigned slice(s) and the current, e.g., updated requirement(s)/preference(s).

To an extent that the profile(s)/policy(s) are not satisfied at 352, a profile and/or policy modification is identified and a determination made at 354 as to whether the modification is authorized. To the extent that the modification is authorized, the profile(s) and/or policy(s) are modified at 356, and network traffic including control plane and data or user plane operations supporting the requesting UE are exchanged at 358 by way of the second network slice(s). Once again, the process 340 can continue from step 344. To the extent that the modification is not authorized, the profile(s) and/or policy(s) are not modified and the process continues from 342, e.g., continuing to forward network traffic according to the first selected/assigned network slices.

While for purposes of simplicity of explanation, the respective processes are shown and described as a series of blocks in FIGS. 3A-3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
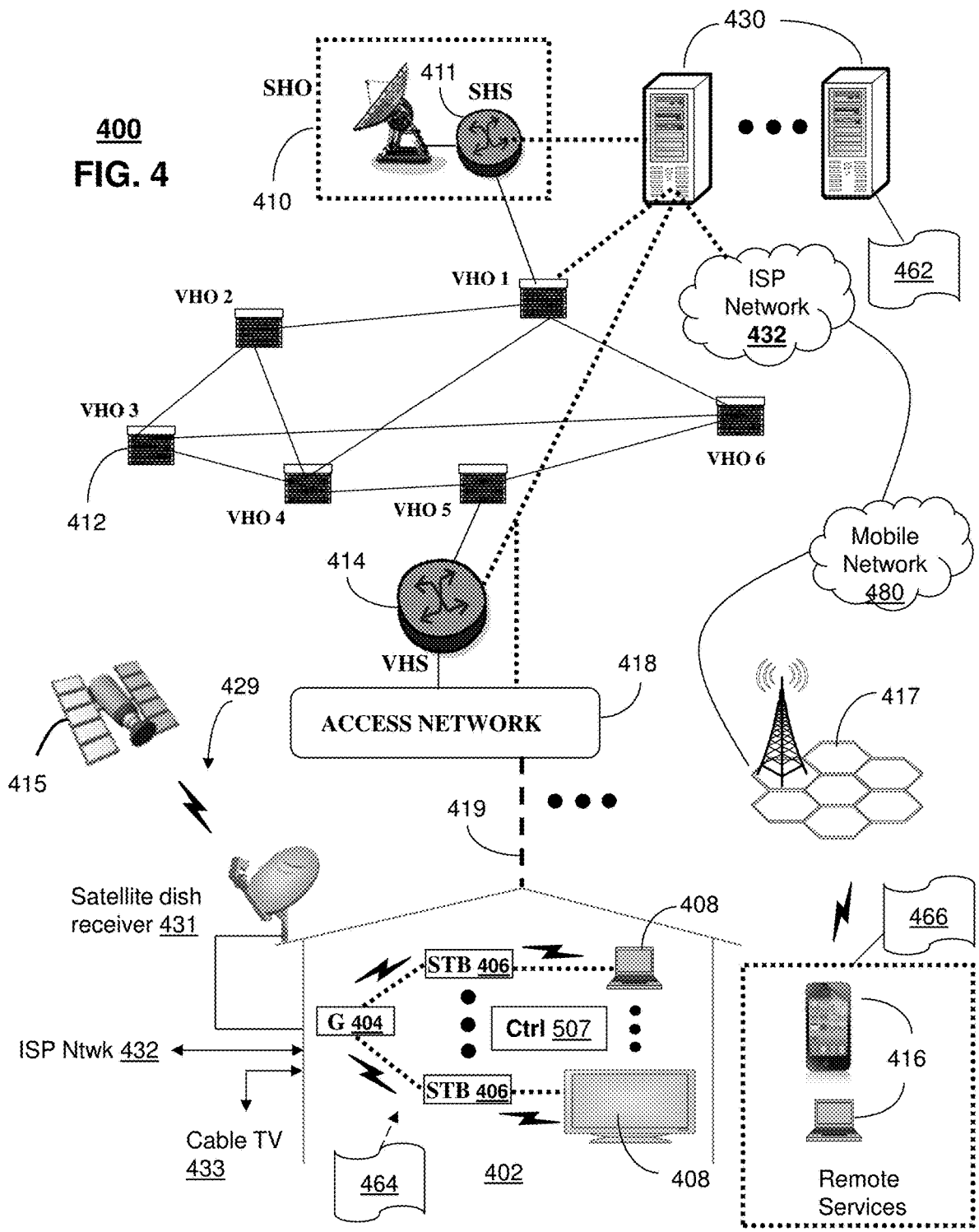
FIGS. 4-5 depict illustrative embodiments of communication systems that provide media services that can be used by the communication networks of FIGS. 1-2.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with the communication networks 100, 200 of FIGS. 1 and/or 2 as another representative embodiment of communication system 400. For instance, one or more devices illustrated in the communication system 400 of FIG. 4, can participate in delivery of a multi-slicing on demand capability, allowing one or more UEs planning or otherwise engaging in a particular service to access, modify or otherwise change a configuration of logical network slices supporting the particular service.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a multi-slicing server (herein referred to as multi-slicing server 430). The multi-slicing server 430 can use computing and communication technology to perform function 462, which can include among other things, the multi-slicing techniques described by processes 300, 340 of FIGS. 3A-B. For instance, function 462 of multi-slicing server 430 can be similar to the functions described for SDN controller 130-145, 210, the service layer 125, 208, the management gateways 142, 204 of FIGS. 1-2 in accordance with process 300. The media processors 406 and wireless communication devices 416 can be provisioned with software functions 464 and 465, respectively, to utilize the services of multi-slicing server 430. For instance, functions 464 and 465 of media processors 406 and wireless communication devices 416 can be similar to the functions described for the communication devices 116, 202 of FIGS. 1-2 in accordance with the process 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
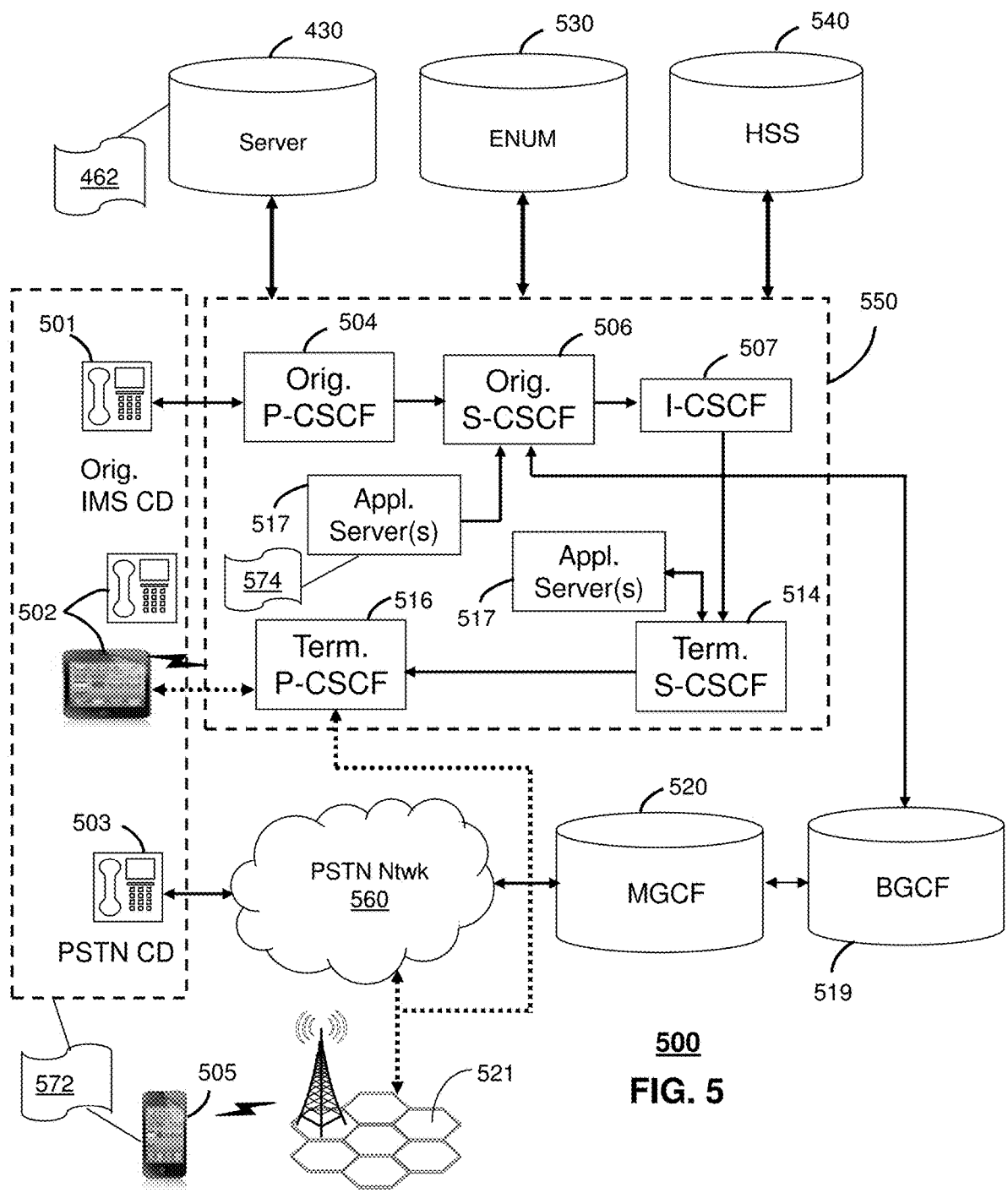

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100, 200 of FIGS. 1 and/or 2 and communication system 400 as another representative embodiment of communication system 400. For instance, one or more devices illustrated in the communication system 500 of FIG. 5, can participate in delivery of a multi-slicing on demand capability, allowing one or more UEs planning or otherwise engaging in a particular service to access, modify or otherwise change a configuration of logical network slices supporting the particular service.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The multi-slicing server 430 of FIG. 4 can be operably coupled to communication system 500 for purposes similar to those described above. Multi-slicing server 430 can perform function 462 and thereby provide multi-slicing services to the CDs 501, 502, 503 and 505 of FIG. 5 similar to the functions described for one or more of the SDN controller 210, the service layer 208 and the management gateway 204 of FIG. 2 in accordance with processes 300, 340 of FIGS. 3A-B. CDs 501, 502, 503 and 505, which can be adapted with software to perform function 572 to utilize the services of the multi-slicing server 430 similar to the functions described for the SDN controller 130-145, 210, the service layer 125, 208 and the management gateways 142, 204 of FIGS. 1-2 in accordance with the processes 300, 340 of FIGS. 3A-B. The multi-slicing server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
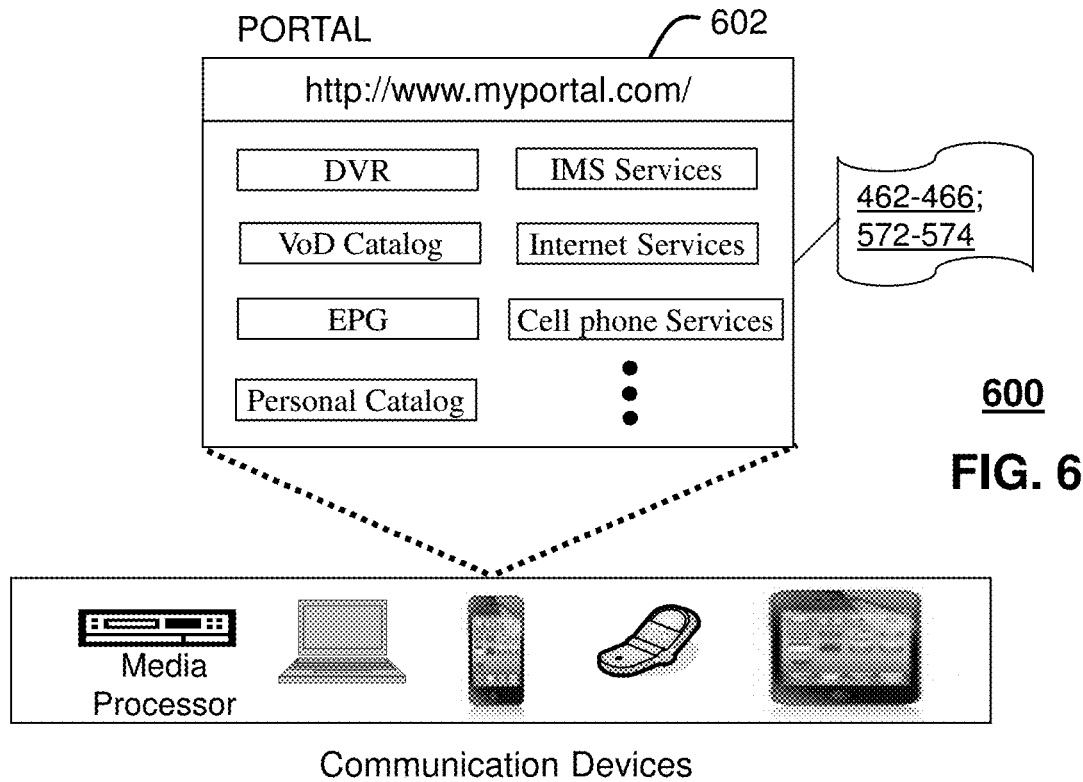
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with systems 100-200 of FIGS. 1 and/or 2, communication system 400, and/or communication system 500 as another representative embodiment of systems 100, 200 of FIGS. 1 and/or 2, communication system 400, and/or communication system 500. The web portal 602 can be used for managing services of systems 100, 200 of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 of FIGS. 1 and/or 2, and communication systems 400-500. For instance, users of the services provided by multi-slicing server 430 can log into their on-line accounts and provision the servers 110 or server 430 with profile information, subscription information, enterprise members, family members, authorization information, conditions, etc., that a user, e.g., a subscriber and/or a provider may want to program such as user profiles, provide contact information to server to enable it to communication with devices described in FIGS. 1-5, and so on. Service providers can log onto an administrator account to provision, monitor and/or maintain the systems 100, 200 of FIGS. 1 and/or 2 or server 430.

Figure 7:
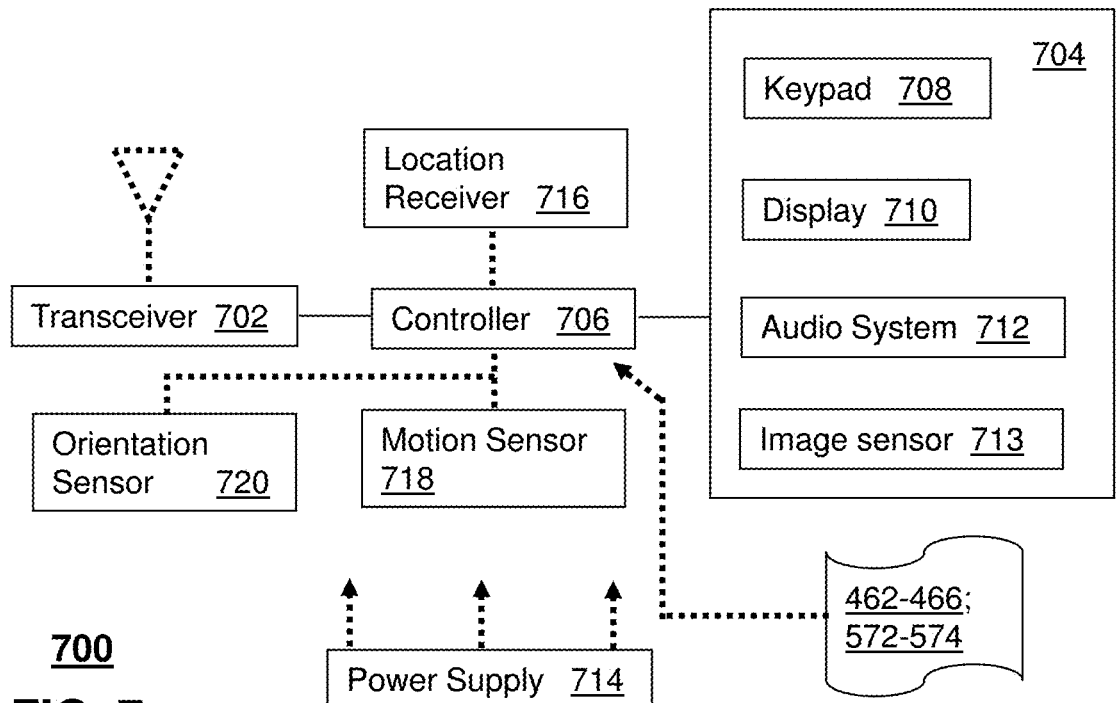
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform at least portions of the process 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, one or more of the communication devices, e.g., UE, can be configured with an application that can be used to coordinate, activate and/or otherwise manage access to multi-slicing on demand features disclosed herein. Such a mobile application can support in-service upgrades, access to a portal to modify profiles, preferences, and the like. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
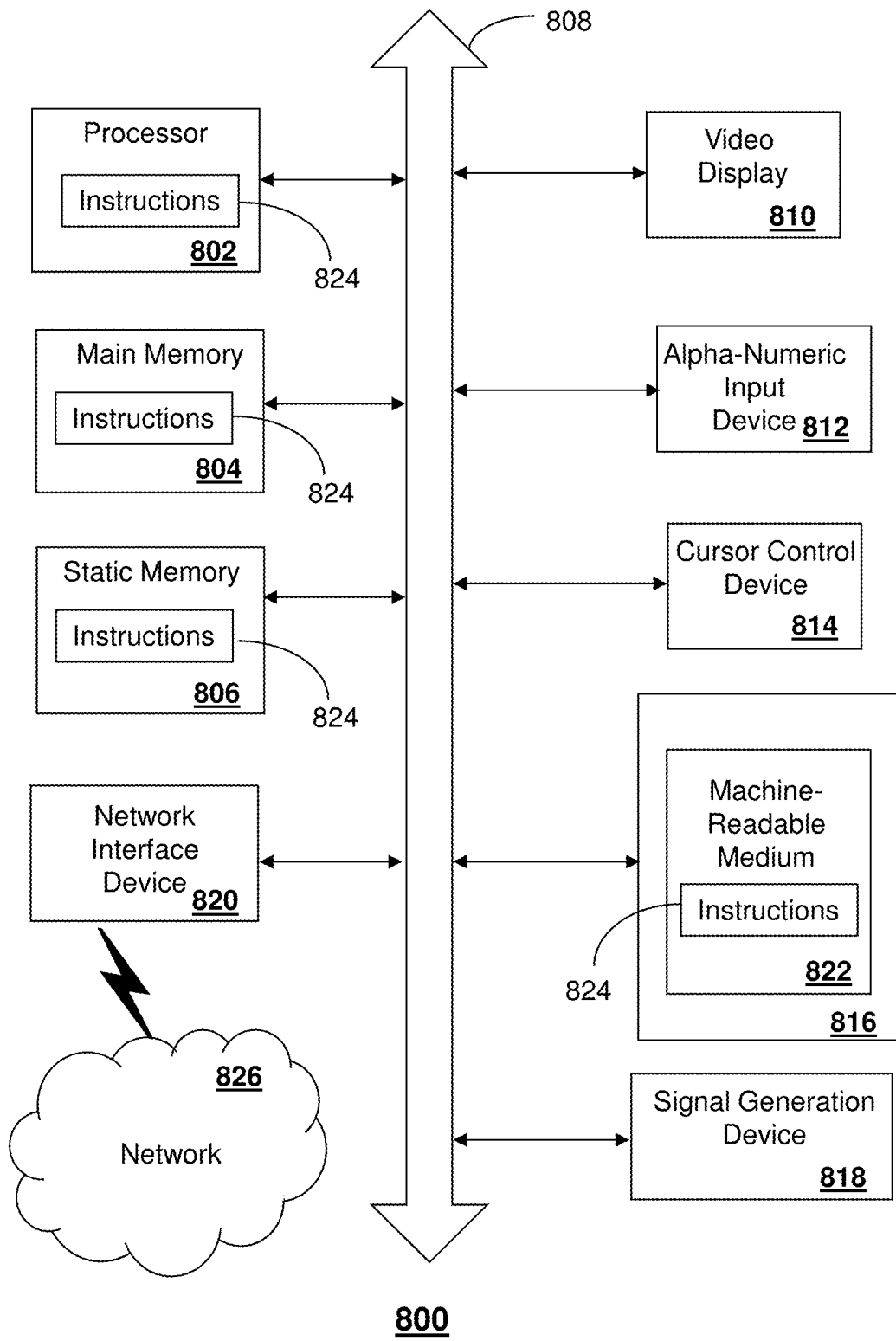
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the multi-slicing server 430, the media processor 406, the SDN controllers 130-145, 210, the service layer 125, 208, the management gateways 142, 204, the access networks 117, 205, the application server 222, a storage device or service 224, general computing hardware supporting one or more of the various VNFs disclosed herein, including VNFs 214, 216, and other devices of FIGS. 1-2 and 4-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system,
   facilitate performance of operations, the operations comprising:
      receiving a first request for a first group of services for a mobile device;
      allocating the first group of services to a first logical network slice of a mobile network;
      receiving a second request for a second group of services for the mobile device;
      determining the second group of services are not supported by the first logical network slice of the mobile network;
      determining the first group of services and the second group of services are supported by a second logical network slice of the mobile network;
      allocating the first group of services and the second group of services to the second logical network slice of the mobile network; and
      providing, utilizing at least in part the second logical network slice, the first group of services and the second group of services to the mobile device.

2. The device of claim 1, wherein the first group of services comprises voice over IP (VoIP) services and the second group of services comprises video conferencing services.

3. The device of claim 1, wherein the operations comprise:
   identifying a user for the mobile device; and
   determining that the user is a subscriber for the first group of services and the second group of services.

4. The device of claim 1, wherein the operations comprise adjusting the second logical network slice to include the first logical network slice.

5. The device of claim 1, wherein the operations comprise allocating first network resources for a limited duration to the second logical network slice to support the first group of services and the second group of services.

6. The device of claim 1, wherein the operations comprise adjusting second network resources for the second logical network slice to support the first group of services and the second group of services.

7. The device of claim 1, wherein the operations comprise receiving a third request for a third group of services for the mobile device.

8. The device of claim 7, wherein the operations comprise:
   determining the first group of services and the third group of services are supported by the first logical network slice of the mobile network;
   allocating the third group of services to the first logical network slice of the mobile network; and
   providing, utilizing at least in part the first logical network slice, the first group of services and the third group of services to the mobile device.

9. The device of claim 7, wherein the operations comprise:
   determining the second group of services and the third group of services are supported by the second logical network slice of the mobile network;
   allocating the third group of services to the second logical network slice of the mobile network;
   providing, utilizing at least in part the first logical network slice, the first group of services to the mobile device; and
   providing, utilizing at least in part the second logical network slice, the second group of services and the third group of services to the mobile device.

10. The device of claim 7, wherein the third group of services comprises streaming services.

11. A non-transitory, machine-readable storage medium, comprising executable instructions that, when executed by a processing system including a processor, facilitate performance of operations, the operations comprising:
   receiving a first request for a first group of services for a mobile device;

allocating the first group of services to a first logical network slice of a mobile network;
receiving a second request for a second group of services for the mobile device;
determining the second group of services are not supported by the first logical network slice of the mobile network;
determining the first group of services and the second group of services are supported by a second logical network slice of the mobile network;
allocating the first group of services and the second group of services to the second logical network slice of the mobile network;
receiving a third request for a third group of services for the mobile device;
determining the first group of services and the third group of services are supported by the first logical network slice of the mobile network;
allocating the third group of services to the first logical network slice of the mobile network;
providing, utilizing at least in part the first logical network slice, the first group of services and the third group of services to the mobile device; and
providing, utilizing at least in part the second logical network slice, the second group of services to the mobile device.

12. The non-transitory, machine-readable storage medium of claim 11, wherein the first group of services comprises voice over IP (VoIP) services and the third group of services comprises video conferencing services.

13. The non-transitory, machine-readable storage medium of claim 11, wherein the operations comprise:
identifying a user for the mobile device; and
determining that the user is a subscriber for the first group of services, the second group of services, and the third group of services.

14. The non-transitory, machine-readable storage medium of claim 11, wherein the operations comprise adjusting the second logical network slice to include the first logical network slice.

15. The non-transitory, machine-readable storage medium of claim 11, wherein the operations comprise allocating first network resources for a limited duration to the first logical network slice to support the first group of services and the third group of services.

16. The non-transitory, machine-readable storage medium of claim 11, wherein the operations comprise adjusting second network resources for the second logical network slice to support the second group of services.

17. A method, comprising:
receiving, by a processing system including a processor, a first request for a first group of services for a mobile device;
allocating, by the processing system, the first group of services to a first logical network slice of a mobile network;
receiving, by the processing system, a second request for a second group of services for the mobile device;
determining, by the processing system, the second group of services are not supported by the first logical network slice of the mobile network;
determining, by the processing system, the first group of services and the second group of services are supported by a second logical network slice of the mobile network;
allocating, by the processing system, the first group of services and the second group of services to the second logical network slice of the mobile network;
receiving, by the processing system, a third request for a third group of services for the mobile device;
determining, by the processing system, the second group of services and the third group of services are supported by the second logical network slice of the mobile network;
allocating, by the processing system, the third group of services to the second logical network slice of the mobile network;
providing, by the processing system, utilizing at least in part the first logical network slice, the first group of services to the mobile device; and
providing, by the processing system, utilizing at least in part the second logical network slice, the second group of services and the third group of services to the mobile device.

18. The method of claim 17, wherein the second group of services comprises voice over IP (VoIP) services and the third group of services comprises video conferencing services.

19. The method of claim 17, comprising
identifying, by the processing system, a user for the mobile device; and
determining, by the processing system, that the user is a subscriber for the first group of services, the second group of services, and the third group of services.

20. The method of claim 17, wherein the first group of services comprises streaming services.

\* \* \* \* \*